US011209970B2

(12) United States Patent
Xu et al.

(10) Patent No.: US 11,209,970 B2
(45) Date of Patent: Dec. 28, 2021

(54) METHOD, DEVICE, AND SYSTEM FOR PROVIDING AN INTERFACE BASED ON AN INTERACTION WITH A TERMINAL

(71) Applicant: BANMA ZHIXING NETWORK (HONGKONG) CO., LIMITED, Kowloon (HK)

(72) Inventors: Kan Xu, Hangzhou (CN); Wei Yao, Beijing (CN)

(73) Assignee: BANMA ZHIXING NETWORK (HONGKONG) CO., LIMITED, Hong Kong (HK)

( * ) Notice: Subject to any disclaimer, the term of this patent is extended or adjusted under 35 U.S.C. 154(b) by 0 days.

(21) Appl. No.: 16/666,008

(22) Filed: Oct. 28, 2019

(65) Prior Publication Data

US 2020/0167064 A1    May 28, 2020

(30) Foreign Application Priority Data

Oct. 30, 2018   (CN) .......................... 201811280800.8

(51) Int. Cl.
  *G06F 3/0484* (2013.01)
  *G06F 3/0488* (2013.01)
  *G06F 3/16* (2006.01)

(52) U.S. Cl.
  CPC ...... *G06F 3/04847* (2013.01); *G06F 3/04883* (2013.01); *G06F 3/167* (2013.01)

(58) Field of Classification Search
  CPC .... G06F 3/0416; G06F 3/0412; G06F 3/0488; G06F 3/04817; G06F 1/1641; G06F 1/1692
  See application file for complete search history.

(56) References Cited

U.S. PATENT DOCUMENTS

| | | | |
|---|---|---|---|
| 5,600,765 A | 2/1997 | Haru | |
| 9,898,642 B2 | 2/2018 | Han et al. | |
| 10,101,803 B2 | 10/2018 | Faaborg et al. | |
| 2005/0288934 A1 | 12/2005 | Omi | |
| 2010/0245267 A1* | 9/2010 | Min | G06F 1/1692 345/173 |
| 2011/0187662 A1* | 8/2011 | Lee | G06F 1/1641 345/173 |
| 2012/0113223 A1 | 5/2012 | Hilliges | |
| 2013/0144629 A1 | 6/2013 | Johnston | |

(Continued)

FOREIGN PATENT DOCUMENTS

WO    2014151663    9/2014

*Primary Examiner* — Toan H Vu
(74) *Attorney, Agent, or Firm* — Van Pelt, Yi & James LLP

(57) ABSTRACT

The present application discloses methods, devices, and a system for an interaction between a terminal and a user. A method includes obtaining, by one or more processors, a first input, the first input being input via a first interaction mode, providing, by the one or more processors, an interface, the interface being displayed based at least in part on the first input, obtaining, by the one or more processors, a second input, the second input being input via a second interaction mode, the second interaction mode being different from the first interaction mode, and performing, by the one or more processors, a function corresponding to the interface, the function being based at least in part on one or more of the first input, the first interaction mode, the second input, and the second interaction mode.

20 Claims, 11 Drawing Sheets

(56) References Cited

U.S. PATENT DOCUMENTS

| | | | |
|---|---|---|---|
| 2013/0154913 A1 | 6/2013 | Genc | |
| 2013/0311920 A1* | 11/2013 | Koo | G06F 3/04817 715/765 |
| 2014/0210753 A1* | 7/2014 | Lee | G06F 3/0488 345/173 |
| 2014/0298273 A1 | 10/2014 | Blackstone et al. | |
| 2014/0325360 A1 | 10/2014 | Jung et al. | |
| 2015/0135108 A1 | 5/2015 | Pope et al. | |
| 2015/0199017 A1 | 7/2015 | Murillo et al. | |
| 2015/0334291 A1* | 11/2015 | Cho | G06F 3/0412 348/222.1 |
| 2016/0018942 A1* | 1/2016 | Kang | G06F 3/0416 345/173 |
| 2018/0348927 A1* | 12/2018 | Jang | G06F 3/0416 |

\* cited by examiner

METHOD, DEVICE, AND SYSTEM FOR PROVIDING AN INTERFACE BASED ON AN INTERACTION WITH A TERMINAL

CROSS REFERENCE TO OTHER APPLICATIONS

This application claims priority to People's Republic of China Patent Application No. 201811280800.8 entitled A DATA PROCESSING METHOD, APPARATUS, AND MACHINE-READABLE MEDIUM filed Oct. 30, 2018 which is incorporated herein by reference for all purposes.

FIELD OF THE INVENTION

The present application relates to a field of computer technology. In particular, the present application relates to a data processing method, a data processing means, an apparatus, and a machine-readable medium.

BACKGROUND OF THE INVENTION

As computer technology develops, technology directed to the interaction between humans and machines has also developed rapidly. Currently, modes for interaction between humans and machines (e.g., voice interaction modes, gesture interaction modes, and touch interaction modes) are relatively mature. The aforementioned modes for interaction between humans and machines are applied to implement routine functions, such as functions for adjusting volume of a terminal, brightness of a display of a terminal, saturation of a display of a terminal, temperature, fan speed, and other parameters.

According to some related art, the aforementioned adjustment functions are implemented via a voice interaction mode. As an example, in the case of a volume adjustment function, voice commands that can be input to invoke control of the volume include: "increase the volume a little," "decrease the volume a little," or "adjust the volume to volume value X." In response to the voice command input by the user, the volume is correspondingly adjusted. For example, the volume value is increased or decreased by the adjustment increment from the current base volume or is adjusted to a defined volume (e.g., value X such as corresponding to a preset volume or a value defined in the voice command). The related art generally requires that the user accurately determine and/or define volume adjustment-related information (e.g., how much is the adjustment increment corresponding to one voice command, determine the current volume value corresponding to the current volume, and determine the required target volume value). If the above information cannot be accurately determined, a user is required to input several commands in order to obtain a desired volume control or desired volume level. Moreover, even if the user is able to accurately determine the aforementioned volume adjustment-related information, the user is required to input multiple voice commands to obtain the required target volume value in the context of controlling or determining the current volume value and/or volume adjustment increment. Accordingly, the related art methods and system for controlling such functions using a voice command are relatively inefficient and operationally difficult from the perspective of user control and/or user experience.

According to some related art, the aforementioned adjustment functions are controlled via a gesture interaction mode. As an example, the gesture interaction mode corresponds to an operational mode via which inputs are made based at least in part on gestures. For example, a predefined set of gestures can be mapped to corresponding functions, and based at least in part on detection of a defined input the user may be provided with N (e.g., N being a natural number) gestures. Different gestures can correspond to different adjustment functions. Accordingly, the user can implement different adjustment functions via inputting different gestures. For example, a single-finger clockwise circling gesture corresponds to a volume increase function. As another example, a single-finger counterclockwise circling gesture corresponds to a volume decrease function. As another example, a two-finger clockwise circling gesture corresponds to a fan speed increase function. As another example, a two-finger counterclockwise circling gesture corresponds to a fan speed decrease function. As another example, a three-finger clockwise circling gesture corresponds to a temperature increase function. As another example, a three-finger counterclockwise circling gesture corresponds to the temperature decrease function. The value of N generally matches the number of functions (e.g., a one-to-one mapping of gestures to functions exists). In implementations according to the related art, N is generally greater than 6, which increases the difficulty of remembering the gestures.

According to some related art, the aforementioned functions are controlled via a touch interaction mode. As an example, the touch interaction mode corresponds to an operational mode via which inputs are made based at least in part on touch inputs such as inputs to a touchscreen. As an example, the user navigates to (e.g., invokes) a first settings interface by first tapping a settings icon provided on the desktop and then searches within the settings interface for a settings option corresponding to a desired adjustment function. The user can input an input for selecting the desired adjustment function (e.g., the user taps an icon or link corresponding to the desired adjustment function to enter (e.g., navigate to) a second settings interface). In response to the second settings interface being provided on the terminal, the user inputs to the second settings interface a set of touch and swipe inputs to invoke the adjustment function adjustment. The use of a touch interaction mode according to the related art in connection with invoking a desired adjustment function requires a user to cause the terminal to switch the interface from the desktop to a first settings interface and then subsequently to a second settings interface. Further such a process using the touch interaction mode according to the related art requires multiple tap operations by the user. Accordingly, the related art methods and system for controlling such functions using a touch input are relatively inefficient and operationally difficult from the perspective of user control and/or user experience.

BRIEF DESCRIPTION OF THE DRAWINGS

Various embodiments of the invention are disclosed in the following detailed description and the accompanying drawings.

DETAILED DESCRIPTION

Figure 1:
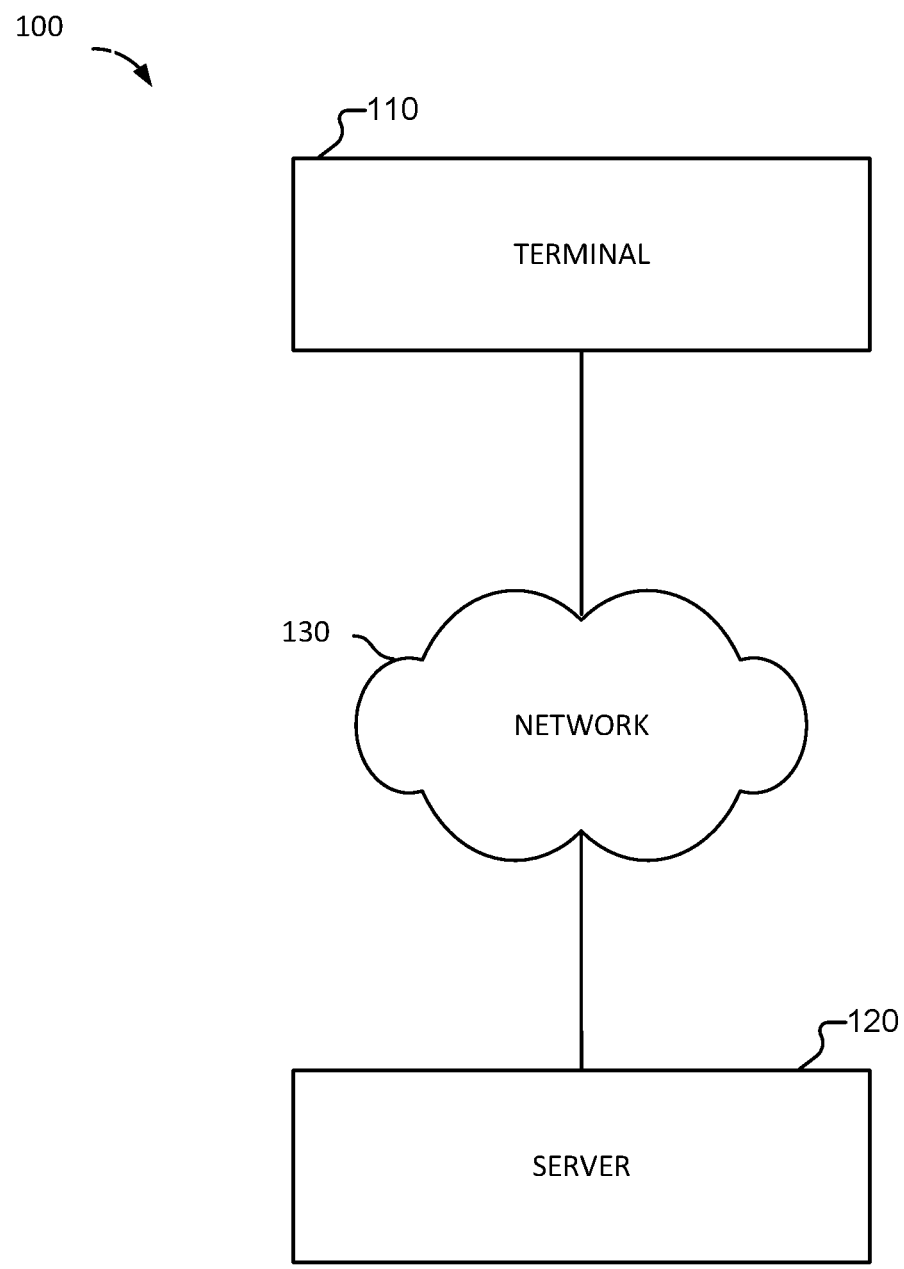
FIG. 1 is a diagram of a system for invoking a function according to various embodiments of the present application.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

To make the above-described objectives, features, and advantages of the present application plainer and easier to understand, the present application is explained in further detail below in light of the drawings and specific embodiments.

The technical schemes in the embodiments of the present application will be clearly and completely described in light of the drawings in specific embodiments of the present application. Obviously, the described embodiments are merely some of the embodiments of the present application and not all the embodiments. All other embodiments obtained by persons with ordinary skill in the art based on the embodiments of the present application fall within the scope of protection of the present application.

The concepts of the present application may easily undergo various modifications and substitutions, and its specific embodiments have already been shown in the drawings and in detailed descriptions herein. However, please note that the purpose of the content described above is not to limit the concepts of the present application to the disclosed specific forms. Rather, the intention of the description and the attached claims of the present application is to cover all modified, equivalent, and substituted forms.

"An embodiment," "embodiments," "a specific embodiment" and other such wording in this description indicate that the described embodiment may include specific features, structures, or characteristics. However, each embodiment may include or may not necessarily include these particular features, structures, or characteristics. In addition, such phrases do not necessarily refer to the same embodiment. In addition, where specific features, structures, or characteristics are described in connection to an embodiment, it may be assumed that, whether or not they are described explicitly, such features, structures, or characteristics are related to other embodiments within the scope of knowledge of persons skilled in the art. In addition, please understand that the items in a list taking the form of "at least one of A, B and C" may include the following possible items: (A), (B), (C), (A and B), (A and C), (B and C), or (A, B and C). Likewise, items listed in the form of "at least one of A, B or C" may imply: (A), (B), (C), (A and B), (A and C), (B and C), or (A, B and C).

In some cases, the disclosed embodiment may be implemented as hardware, firmware, software, or any combination thereof. A disclosed embodiment may also be implemented as instructions that are carried or stored in one or more temporary or non-temporary machine-readable (e.g., computer-readable) storage media. These instructions can be executed by one or more processors. Machine-readable media may be implemented as storage devices, mechanisms, or other physical structures (e.g., volatile or non-volatile memory, disks, or other media or other physical structure devices) for storing or transmitting information in machine-readable form.

In the drawings, some structures or method features may be displayed in specific arrangements and/or sequences. However, preferably, such specific arrangements and/or sequences are not necessary. Rather, in some embodiments, such features may be laid out in ways and/or sequences that differ from what is shown in the drawings. In addition, the content of structural or method features included in a specific drawing does not imply that such features are necessary in all embodiments. Moreover, in some embodiments, these features may not be included, or they may be combined with other features.

As used herein, a "terminal" generally refers to a device comprising one or more processors. A terminal can be a device used (e.g., by a user) within a network system and used to communicate with one or more servers. According to various embodiments of the present disclosure, a terminal includes components that support communication functionality. For example, a terminal can be a smart phone, a server, a machine of shared power banks, information centers (such as one or more services providing information such as traffic or weather, etc.), a tablet device, a mobile phone, a video phone, an e-book reader, a desktop computer, a laptop computer, a netbook computer, a personal computer, a Personal Digital Assistant (PDA), a Portable Multimedia Player (PMP), a Moving Picture Experts Group Audio Layer III (mp3) player, a Moving Picture Experts Group Audio Layer IV (mp4) player, a mobile medical device, a camera, a wearable device (e.g., a Head-Mounted Device (HMD), electronic clothes, electronic braces, an electronic necklace, an electronic accessory, an electronic tattoo, or a smart watch), a kiosk such as a vending machine, a smart home appliance, vehicle-mounted mobile stations, a car, or the like. A terminal can run various operating systems.

As used herein, a gesture interaction mode corresponds to an operational mode via which inputs are made based at least in part on gestures (e.g., gestures made by a user and detected by a terminal, such as hand gestures).

As used herein, a voice interaction mode corresponds to an operational mode via which inputs are made based at least in part on a voice input (e.g., a voice command or other sound input by a user and detected by a terminal such as by a microphone associated with the terminal).

As used herein, a touch interaction mode corresponds to an operational mode via which inputs are made based at least in part on touch inputs (e.g., inputs to a touchscreen, etc.). Other inputs can be input via a touch input. In some embodiments, a touch interaction mode includes a mode according to which an input is made to a graphical user interface such as an input made by a peripheral device connected to a terminal (e.g., a keyboard, a mouse, etc.).

Various embodiments provide a method, system, and/or device for processing data. According to various embodiments, one or more terminals are caused to perform a function based at least in part on a plurality of inputs that are input using a plurality of interaction modes. In some embodiments, the plurality of interaction modes include a touch interaction mode, a voice interaction mode, a gesture interaction mode, a keyboard and/or mouse interaction mode, an interface interaction mode (e.g., an interaction mode via which inputs are made to a graphical user interface, etc.), etc. Various other interaction modes can be implemented.

According to various embodiments, an interface is provided at a target position of a screen (e.g., of a terminal or a display connected to a terminal) in response to a first input from a user. The target position can correspond to the hand position of the user (e.g., a position of a hand relative to one or more sensors or a field of view of the one or more sensors). The first input corresponds to an input via a first interaction mode. The interface can be associated with a second interaction mode. For example, the second interaction mode is a mode by which an input is input to the interface such as via a touch input or via a mouse or other peripheral device. In some embodiments, a function corresponding to the interface is executed in response to a second input being obtained (e.g., from the user). The second input can correspond to an input via the second interaction mode.

Various embodiments implement a first interaction mode and a second interaction mode to perform a function or to cause a function to be performed (e.g., a terminal to which the inputs are input using the various interaction modes communicates with another device to perform a function or invoke a function to be performed). In some embodiments, the first interaction mode is different from the second interaction mode. For example, inputs to the first interaction mode are made in a manner that is different from a manner by which inputs to the second interaction mode are made. The first input corresponds to an input via the first interaction mode. The first input via the first interaction mode is used in connection with triggering display of an interface (e.g., a graphical user interface). The second input corresponds to an input via a second interaction mode. The first input via the first interaction mode is used in connection with triggering execution of (e.g., invoking) a function corresponding to the interface. Embodiments combine the advantages of a first interaction mode and a second interaction mode and can avoid the defects of the first interaction mode or the second interaction mode. Embodiments implement a function (e.g., cause a function to be performed) via a first input and a second input and thus may reduce operational difficulty for the user while improving operational efficiency for the user.

According to various embodiments, function information is provided via the interface and the function information can help the user to generate a precise second input. The function information can include a current status of the function or results of execution of the function. In some embodiments, the function information is provided in response to the first input being input via the first interaction mode. The function information can indicate functions that can be performed, results of the first input being obtained, etc. The function information can inform the user to facilitate the user providing a precise second input. Therefore, the providing the function information in response to the first input can reduce the operational difficulty for the user by, for example, decreasing the number of human-machine interactions (e.g., human-machine voice interactions). In some embodiments, the function information is provided via a graphical user interface provided on a display associated with a terminal (e.g., a terminal to which the first input is input, etc.).

Because the interface is applicable to various functions and various types of functions, different types of functions can share gestures. According to various embodiments, one or more functions are mapped to a single gesture (e.g., various embodiments can implement a many-to-one mapping of functions to gestures). As a result, fewer gesture patterns are implemented (e.g., required) and the difficulty of learning and memorizing gestures is reduced for users. For example different functions such as functions relating to volume, brightness, saturation, contrast, temperature, and fan speed can share gestures and thus the number of gesture patterns can be reduced. In some embodiments, the mapping of one or more functions to gestures is stored (e.g., locally at a terminal, remotely such as at a location accessible to the terminal, etc.).

Because various embodiments can quickly and directly obtain an interface in response to obtaining a first input (e.g., from a user of a terminal), the number of operating paths used in connection with implementing a function via a second interaction mode (e.g., a touch interaction mode) can be decreased and thus the operational difficulty for the user is reduced.

In some embodiments, a target position of an interface on a screen (e.g., of the terminal) corresponds to a position of a particular object or part of the user. For example, the interface target position of the screen corresponds to a position of the user's hand. The target position corresponding to a position of the particular object can refer to the target position of the interface (e.g., a position at which the interface is provided) in relation to the screen matches a position of the particular object (e.g., the user's hand) in relation to the terminal and/or to one or more sensors of the terminal. For example, the position of the user's hand can correspond to a position of a hand relative to one or more sensors or a field of view of the one or more sensors. As an example, if the user positions the user's hand at the bottom left portion of the screen, the interface is displayed at the bottom left of the screen. According to various embodiments, the interface is provided (e.g., on the screen of the terminal) based at least in part on the position of the particular object. In response to obtaining the first input based on a first interaction mode, the terminal determines a position of the particular object (e.g., the user's hand) and provides the interface based at least in part on the first input and/or the position of the particular object. The positioning of the interface based at least in part on the position of the particular object (e.g., the user's hand) increases relatedness between the user (e.g., the hand) and the interface. The positioning of the interface based at least in part on the position of the particular object facilitates an experience for the user according to which the interface is positioned wherever the hand is positioned (e.g., the position of the interface matches the position of the user's hand). Accordingly, hand operations become more convenient for a user, and the user experience is improved.

Various interaction modes can be implemented for the first interaction mode and the second interaction mode (e.g., according to actual application needs). In some embodiments, an administrator or user can configure the particular interaction mode corresponding to the first interaction mode and/or the second interaction mode. The interaction mode corresponding to the first interaction mode and/or the second interaction mode can be configured based on terminal settings, user preferences, historical information pertaining to use of the terminal or interaction with an interface, etc.

In some embodiments, the first interaction mode is a voice interaction mode, and the second interaction mode is a gesture interaction mode or a touch interaction mode. According to an example in which the first interaction mode is a voice interaction mode, and the second interaction mode is a gesture interaction mode or a touch interaction mode, the lengthy interaction process entailed in an interaction mode limited only to voice is improved. For example, the terminal invokes (e.g., displays) an interface in response to a voice input, and the user can input the second input quickly and conveniently via the gesture interaction mode or the touch interaction mode to implement a corresponding function (e.g., a function corresponding to the interface). The interface is provided quickly and conveniently in response to the voice input, and the user is able to input the second input quickly and conveniently through the gesture interaction mode or the touch interaction mode to implement a function corresponding to the interface. If the second interaction mode corresponds to a gesture interaction mode (e.g., such that the second input is input via a gesture interactive operation), different types of functions can share gestures. For example, a single gesture can be mapped to different types of functions. A function to be invoked can be determined based at least in part on the first input and the second input (e.g., the obtained gesture corresponding to the second input in combination with the particular interface being provided and/or the first input). Because a plurality of functions can be mapped to a single gesture, fewer gestures (e.g., gesture patterns) are used, and thus the user encounters less difficulty in learning and memorizing gestures.

In some embodiments, the first interaction mode is a touch interaction mode, and the second interaction mode is to be a gesture interaction mode or a voice interaction mode. According to an example in which the first interaction mode is a touch interaction mode, and the second interaction mode is a gesture interaction mode or a voice interaction mode, the first input can be a preset touch input. The preset touch input can be an operation corresponding to a preset number of screen taps, an operation corresponding to a screen tap with a preset pressing force, or a swipe operation corresponding to a preset path produced on the screen. Various preset touch inputs can be mapped to one or more corresponding functions. A mapping of the various preset touch inputs to one or more corresponding functions can be stored locally at the terminal or at a remote storage that is accessible to the terminal. The one or more corresponding functions mapped to the preset touch input can include invoking an interface, etc. In response to receiving the first input, the terminal can obtain (e.g., invoke) an interface. The interface can be invoked based at least in part on the first input. In some embodiments, function information is provided (e.g., displayed) via the interface. As an example, the interface can provide the current status of the function, or results of the user's execution of the function, etc. The function information can be used in connection with obtaining the second input. For example, the user can use the function information to generate a precise second input. The terminal obtains the second input and performs a function based at least in part on the second input. The terminal can determine the function to perform in response to obtaining the second input, and the function to be performed can be determined based at least in part on one or more of the first input, the interface, and/or the second input. Therefore, the function information can reduce the operational difficulty for the user by, for example, decreasing the number of human-machine voice interactions. As an example according to which the first input is associated with a volume control function, the interface can provide (e.g., display) a current value and maximum value of the volume (e.g., a playback volume of the terminal, etc.) to help the user with determining the required target volume value X and inputting the second input for triggering an adjustment to the target volume X (e.g., by a voice command, etc.).

In some embodiments, the first interaction is a gesture interaction mode, and the second interaction mode is a touch interaction mode or a voice interaction mode. According to an example in which the first interaction mode is a gesture interaction mode, and the second interaction mode is a touch interaction mode or a voice interaction mode, the first input can be a preset gesture input. Various preset gesture inputs can be mapped to one or more corresponding functions. A mapping of the various preset gesture inputs to one or more corresponding functions can be stored locally at the terminal or at a remote storage that is accessible to the terminal. The one or more corresponding functions mapped to the preset gesture input can include invoking an interface, etc. The gesture input can correspond to an operation in which a particular object (e.g., the user's hand) moves horizontally or vertically in circles or in any other direction. Movement of the particular object can be determined in relation to the terminal (e.g., a movement of the particular object relative to the terminal or one or sensors of the terminal). In response to receiving the first input, the terminal can obtain (e.g., invoke) the interface. The interface can be invoked based at least in part on the first input. In some embodiments, function information is provided (e.g., displayed) via the interface. As an example, the interface can provide the current status of the function, or results of the user's execution of the function, etc. The function information can be used in connection with obtaining the second input. For example, the user can use the function information to generate a precise second input. The terminal obtains the second input and performs a function based at least in part on the second input. The terminal can determine the function to be performed in response to obtaining the second input, and the function to be performed can be determined based at least in part on one or more of the first input, the interface, and/or the second input.

In some embodiments, application contexts include remote operation contexts, close range contexts (e.g., for instances when precise operation is inconvenient), touchscreen contexts, etc. Various other application contexts are possible. Remote operation contexts can include: smart television contexts and large-screen contexts. Close range contexts can include: driving contexts.

As an example, in the case of a driving context, the user generally is required to focus the user's attention on driving (e.g., the user focuses attention on the road conditions surrounding the vehicle in order to drive safely). Therefore, the user's attention is focused on driving and the user cannot conveniently perform precise operations. Various embodiments support the user in implementing a desired function based at least in part on obtaining a first input via a first interaction mode and one or more second inputs via a second interaction mode. The first interaction mode can be a voice interaction mode, and the second interaction mode can be a gesture interaction mode. Because both the voice interaction mode and the gesture interaction mode are interaction modes that do not require the user to provide physical contact with the terminal, the use of the voice interaction mode and the gesture interaction mode in connection with invoking a function allows the user to focus on driving without having to direct the user's attention elsewhere. Accordingly, such use of the use of the voice interaction mode and the gesture interaction mode in connection with invoking a function can improve driving safety. In some embodiments, one of the first interaction mode and the second interaction mode is an interaction mode that does not require the user to provide physical contact with the terminal (e.g., a voice interaction mode or a gesture interaction mode), and the other of the first interaction mode and the gesture mode is a touch interaction mode.

As an example, in the case of a terminal having a touchscreen, then in a touchscreen context, related art generally requires a user to navigate through multiple levels of an interface before entering the function interface (e.g., a desired interface via which a user can control and/or invoke a corresponding function). According to various embodiments, the interface is invoked in response to a first input via a first interaction mode (e.g., the voice interaction mode) and the desired function is invoked in response to a second input via the second interaction mode (e.g., the gesture interaction mode). In response to the second input, the terminal performs or causes another terminal to perform (e.g., via sending an instruction to the other terminal) the corresponding function. Therefore, various embodiments decrease the operating paths involved in implementing a function in comparison to the touch interaction mode of the related art, and thus various embodiments reduce the operational difficulty for the user.

FIG. 1 is a diagram of a system for invoking a function according to various embodiments of the present application.

Referring to FIG. 1, system 100 for invoking a function or controlling a terminal is provided. System 100 can implement at least part of process 200 of FIG. 2, process 300 of FIG. 3, interaction 400 of FIG. 4, interaction 500 of FIG. 5, interaction 600 of FIG. 6, interaction 700 of FIG. 7, process 800 of FIG. 8, interaction 900 of FIG. 9, and/or interaction 1000 of FIG. 10. System 100 can be implemented at least in part by computer system 1100 of FIG. 11.

System 100 comprises terminal 110. System 100 can further include server 120 with which terminal 110 communicates. In some embodiments, system 100 includes network 130 over which terminal 110 and server 120 communicate.

Network 130 can be a wired network such as a local area network. In some embodiments, network 130 is a wireless network such as a cellular network, a WiFi network, a satellite communication network, a wireless local area network, etc.

According to various embodiments, terminal 110 obtains a first input via a first interaction mode. As an example, a user inputs the first input (e.g., a voice input, a gesture, and/or a touch input) to terminal 110. In response to receiving the first input, terminal 110 obtains an interface based at least in part on the first input. As an example, the interface is obtained from local storage of terminal 110 based at least in part on the first input. Terminal 110 can store a mapping of inputs to interfaces, and terminal 110 can determine the interface based at least in part on the first input and the mapping of inputs to interfaces. As another example, the interface is generated based at least in part on the first input. Terminal 110 can generate the interface based at least in part on the first input and one or more templates and/or protocols for generating the interface. The one or more templates and/or protocols can be stored locally at terminal 110 and/or stored at server 120.

In some embodiments, terminal 110 determines the interface and/or obtains the interface 110 based at least in part on information that terminal 110 receives from server 120. For example, in response to receiving the first input, terminal 110 provides to server 120 information pertaining to the first input (e.g., an indication that the first input is received, a corresponding type of input, a command associated with the first input, etc.). Server 120 can provide to terminal 110 the interface or information pertaining to the interface (e.g., information from which the interface is determined, and/or information from which the interface is generated).

In response to obtaining the interface (e.g., obtaining the interface from storage, determining the interface, generating the interface, etc.), terminal 110 provides the interface. For example, terminal 110 displays the interface on a display (e.g., a touchscreen). Terminal 110 can obtain a second input via a second interaction mode. For example, the user inputs the second input to terminal 110 via the second interaction mode. According to various embodiments, the second interaction mode is different from the first interaction mode. The second input can be input with respect to the interface. For example, the second input can correspond to an interaction with the interface (e.g., by the user).

In response to obtaining the second input, terminal 110 performs a corresponding function. In some embodiments, terminal 110 stores a mapping of inputs to functions (or has remote access to such a mapping) and terminal 110 determines the function corresponding to the second input based at least in part on the mapping of inputs to functions. In some embodiments, the function performed in response to the second input is based at least in part on the second input and one or more of the interface, the first input, the first interaction mode, and the second interaction mode. In some embodiments, a corresponding function is to be performed at server 120. For example, in response to receiving the second input, terminal 110 provides server 120 with an instruction corresponding to the second input to cause server 120 to perform a corresponding function (e.g., store information, provide a location-based service to terminal 110, provide information to terminal 110, provide information to another terminal connected to network 130, and/or cause another terminal connected to network 130 to perform a function).

In some embodiments, terminal 110 and/or server 120 runs a client. The client can provide an application context such as the application context in which the first input and/or the second input is obtained. For example, the client may be an application (app), such as a navigation app, an e-commerce app, an instant messaging app, an input method app, a weather app, a media playback app, a social media app, or an app that comes with an operating system, running on a terminal, etc. Terminal 110 and/or server 120 can run various apps which can provide the application context according to which the first input and/or the second input is obtained.

In some embodiments, terminal 110 and/or server 120 includes a built-in or externally-connected screen. The screen is configured to display information such as the interface that is invoked in response to the first input via the first interaction mode.

Terminal 110 can correspond to, or comprise a vehicle-mounted device. Examples of vehicle-mounted devices include: head-up displays (HUDs). A HUD is generally installed in front of the driver. The HUD can provide the driver of the vehicle with various trip information such as vehicle speed, fuel consumption, navigation, vehicle information such as a status of one or more characteristics of the vehicle (e.g., a status of one or more doors, an air pressure warning for a tire, an alert triggered by information obtained by one or more sensors connected to the vehicle, etc.), and paired mobile device information such as even incoming phone calls and message notifications. The HUD can provide such information during driving. In other words, the HUD can integrate many functions into one unit and thus help the driver to concentrate on road and traffic conditions.

According to various embodiments, the functions performed by the terminal (e.g., in response to the second input being obtained) can include, for example, system functions and/or application functions. System functions can include parameter setting functions such as settings relating to volume (e.g., volume of media playback, volume of alerts, etc.), brightness (e.g., brightness of the display on the vehicle, brightness on the mobile device paired to a vehicle, etc.), saturation, indicator parameters, contrast, temperature, and fan speed. Various other parameter setting functions can be implemented. Application functions can include functions internal to an application program. An application program can determine the functions according to actual application need. An example of a function determined according to an application need includes a display parameter setting function for a browser application. An application function can be a function for obtaining information pertaining to the application (e.g., to display a menu, to play back a desired media file, to obtain information from a server such as location-based service information, etc.).

According to various embodiments, the functions in performed by the terminal (e.g., in response to the second input being obtained) are system-wide functions, such as parameter adjusting functions relating to PC volume, brightness, and backlighting or to vehicle-mounted device volume, fan speed, or temperature. In other words, various embodiments can adjust or control volume, fan speed, temperature, or another system function for a vehicle-mounted device. In some embodiments, the terminal adjusts or controls volume, brightness, saturation, or another system function for a smart television set. In some embodiments, the terminal adjusts or controls volume, brightness, or another system function for a large screen such as in a PC or tablet. In some embodiments, the terminal adjusts or controls volume, brightness, or another system function for a mobile device.

Parameters that are controlled or adjusted based at least in part on a system-wide function (e.g., a parameter adjusting function) such as in response to an input by a user can include operating parameters of components connected to (or implemented by) the terminal. The connection of the components to the terminal can include: non-contact connections (such as network connections) and/or contact connections. Volume in this context can refer, for example, to the operating parameter of the sound-producing component of a speaker (e.g., a speaker of a vehicle, a speaker of a mobile device, a Bluetooth speaker connected to the terminal, etc.). Brightness, saturation, and contrast can refer, for example, to the operating parameters of a screen display of a terminal. Temperature and fan speed can refer, for example, to the operating parameters of an air-conditioner. As an example, in a driving context, the operating parameters of a vehicle-mounted air-conditioner can be adjusted or controlled via a vehicle-mounted device. As an example, in a household context, operating parameters of a home air-conditioner can be adjusted or controlled through a smart television set or a smart phone. Various other operating parameters can be adjusted and/or controlled (e.g., based at least in part on one or more inputs).

Various embodiments include a gesture recognition apparatus to obtain a user gesture and recognize the obtained gesture. The gesture recognition apparatus can include one or more sensors. The one or more sensors can detect a gesture and provide corresponding information to a processor that processes the information to determine the gesture. Accordingly, the terminal can respond (e.g., perform one or more functions in response) to the gesture recognition result. The gesture recognition includes detecting a gesture, determining a type of gesture, and/or determining context information pertaining to a context of the terminal if the gesture is obtained.

According to various embodiments, an orientation of a gesture includes one or more of direction, angle, shape, and arc. Various gestures can be detected or obtained by the terminal. For example, in an implementation, a diverse set of gestures can be obtained via a hand in a preset state moving in any direction, circling a point on a plane, or rotating along an axis. Preset states of a hand in connection with obtaining a gesture can include a fist, an open palm, a half-open palm, a particular configuration of fingers extended, etc. Various gestures can be defined and/or mapped to various functions. A user or administrator can define gestures. Defining a gesture can include characterizing the orientation of the gesture. The definition of a gesture can be modified based on historical information such as via use of a learning or training algorithm that defines the gesture based in part on past gestures obtained from the user (e.g., from a same user, or from different users). A gesture can be used and/or defined according to actual application (e.g., a context or implementation).

According to various embodiments, the gesture recognition includes one or more of: at least two infrared cameras, an image-capturing module, infrared light-emitting diodes, an infrared light-emitting diode driver, a calculating module, and a gesture recognition module. The image-capturing module is electrically connected to the two infrared cameras. The infrared light-emitting diode driver is electrically connected to the infrared light-emitting diodes and configured to drive the infrared light-emitting diodes to emit light. The calculating module is electrically connected to the image-capturing module, the infrared light-emitting diode driver, and the gesture recognition module. The image-capturing module captures gesture image data through the two infrared cameras and provides the gesture image data to the calculating unit for processing. The calculating module obtains the gesture image data and, after subjecting the gesture image data to three-dimensional coordinate positioning, provides the resulting image data to the gesture recognition module. The gesture recognition module recognizes (e.g., determines) the gesture via pattern matching. For example, a mapping of gesture information (e.g., processed image data corresponding to gestures) to gestures is queried to determine the gesture that is obtained.

The gesture recognition apparatus can be independent of, or integrated into, the terminal 110 (e.g., the terminal used to implement various embodiments). Embodiments of the present application impose no restrictions as to specific gesture recognition apparatuses or as to the specific relationship between a gesture recognition apparatus and the terminal used to implement a method according to embodiments of the present application.

Figure 2:
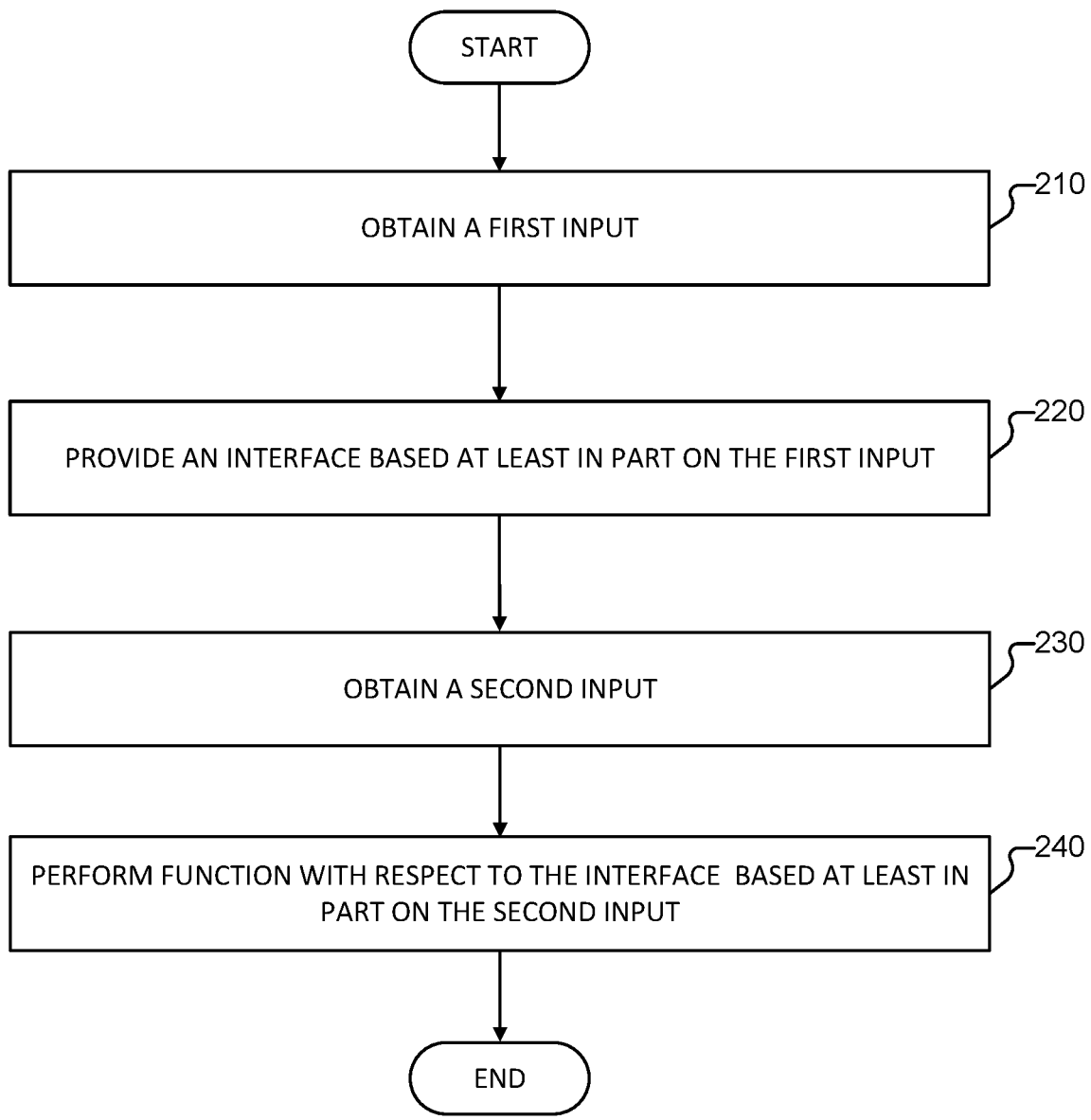
FIG. 2 is a flowchart of a data processing method according to various embodiments of the present application.

FIG. 2 is a flowchart of a data processing method according to various embodiments of the present application.

Referring to FIG. 2, process 200 for processing data is provided. Process 200 can implement invocation of a function or control of a terminal. Process 200 can be implemented in connection with at least part of process 300 of FIG. 3, interaction 400 of FIG. 4, interaction 500 of FIG. 5, interaction 600 of FIG. 6, interaction 700 of FIG. 7, process 800 of FIG. 8, interaction 900 of FIG. 9, and/or interaction 1000 of FIG. 10. Process 200 can be implemented at least in part by system 100 of FIG. 1 and/or computer system 1100 of FIG. 11.

At 210, a first input is obtained. In some embodiments, a terminal receives the first input from a user (e.g., based on a user interacting with the terminal). The first input can be one or more of a touch input, a voice input, a gesture, an input to a peripheral device, etc. The first input is obtained via a first interaction mode. The first interaction mode can be configured based on terminal settings, user preferences, historical information pertaining to use of the terminal or interaction with an interface, etc.

According to various embodiments, the first interaction mode is a touch interaction mode, a voice interaction mode, a gesture interaction mode, a keyboard and/or mouse interaction mode, an interface interaction mode (e.g., an interaction mode via which inputs are made to a graphical user interface, etc.), etc. Various other interaction modes can be implemented. The first interaction mode can be determined based at least in part on the first input. For example, the first interaction mode can be determined based on a type of input associated with the first input (e.g., whether the first input is a voice command, a touch input, a gesture, etc.). The terminal can receive the first input and determine that the first input corresponds to an input mapped to a particular interaction mode. The terminal can determine that the first interaction mode corresponds to the particular interaction mode associated with the first input. In some embodiments, the terminal operates according to the first interaction mode before the first input is received.

In some embodiments, the first input is used to trigger display of an interface. For example, the first input can be mapped to a function that invokes an interface, and in response to the terminal obtaining the first input, the terminal invokes and displays the interface based on the first input in connection with a query of the mapping of inputs to functions.

Various interaction modes can be implemented as the first interaction mode. The interaction mode to be used as the first interaction mode can be set by a user (e.g., selected by a user, or set according to user preferences, etc.), an administrator or a developer associated with the terminal, or the application corresponding to the application context in which the first input is obtained.

According to various embodiments, the first interaction mode is a voice interaction mode, and the first input is a voice command. The voice command can characterize (e.g., describe) the function to be performed (e.g., the invocation of the interface, etc.). The voice command can include information describing the function to be performed. The voice command can include an identifier (e.g., ID) of the function to be triggered (e.g., invoked). For example, the voice command includes the function name of the function to be performed. The voice command can include information indicating a type of function to be performed and/or a parameter associated with the function to be performed.

In some embodiments, the first interaction mode is a gesture interaction mode. The first input can be a hand operation (e.g., that is input by the user in relation to one or more sensors). The hand operation can include movement in any direction such as horizontal, vertical, or circling.

In some embodiments, the first interaction mode is a touch interaction mode. The first input can be an operation including a preset number of screen taps, an operation including a screen tap with a preset pressing force, a swipe operation including a preset path produced on the screen, etc. The swipe operation can include a swipe having one or more characteristics including direction, length, location at which swipe begins, location at which swipe ends, etc. The preset pressing force may be obtained through 3D touch technology.

At 220, an interface is provided. In some embodiments, the terminal provides the interface. For example, the terminal displays the interface on a display (e.g., a touchscreen). According to various embodiments, the interface is provided based at least in part on the first input. For example, in response to receiving the first input, the terminal obtains the interface. The interface can be preset or preconfigured before the terminal receives the first input, or the interface can be configured or generated based at least in part on the first input. For example, the interface can be configured based on a particular command associated with the first input, a type of input corresponding to the first input, a type of command associated with the first input, a first interaction mode via which the first input is received, etc.

According to various embodiments, the interface is provided at a target position in relation to a screen. The target position corresponds to a position on the screen at which the interface is displayed. For example, the interface is provided at a bottom left corner of the screen, a top left corner of the screen, a middle of the screen, a top right corner of the screen, a bottom right corner of the screen, etc.

In some embodiments, a target position corresponds to a position of a particular object such as the position of a hand of the user (e.g., a position of a hand relative to one or more sensors or a field of view of the one or more sensors). For example, the position of the user's hand can correspond to a position of a hand relative to one or more sensors or a field of view of the one or more sensors. According to various embodiments, the interface is provided (e.g., on the screen of the terminal) based at least in part on the position of the particular object. In response to obtaining the first input based on a first interaction mode, the terminal determines a position of the particular object (e.g., the user's hand) and provides the interface based at least in part on the first input and/or the position of the particular object. Thus, relatedness between the hand and the interface is increased, and the user experiences an effect in which the interface is located wherever the user's hand is located. As a result, hand operations become more convenient, and the user experience is improved.

In some embodiments, the hand position is the operation-triggering position. As an example, the operation-triggering position corresponds to a location (e.g., position) at which a touch input is input to a touchscreen (e.g., a position at which the hand touches the touchscreen, a position at which a stylus touches the touchscreen, etc.). As another example, the operation-triggering position corresponds to a location at which a hand (or other input element such as a stylus, a finger, etc.) hovers in front of the screen. In some embodiments, the operation-triggering position corresponds to a position associated with a voice input. For example, a location of a source of a voice input (e.g., a user) can be determined and deemed to be the operating position associated with the voice input. As an example, if the source of the voice input is located at "center of the screen," then the center of the screen is determined to be the operation-triggering position. According to various embodiments, the operation-triggering position is determined based at least in part on a real-time instruction or a setting obtained from the operating system or another app. For example, the operation-triggering position is based on screen coordinate information output by the operating system or another app.

In some embodiments, the interface corresponds to a second interaction mode. For example, the interface is configured and/or provided in connection with receiving one or more inputs via the second interaction mode. According to various embodiments, the second interaction mode is different from the first interaction mode. The second interaction mode can be determined (e.g., selected) based at least in part on the first input and/or an application context. For example, the second interaction mode is determined based at least in part on a context of a terminal. If the terminal is a mobile terminal paired with a vehicle or if the terminal is a vehicle, the context of the terminal can be the vehicle moving, the vehicle in a parked state, etc. The context of the terminal can be determined based on whether a particular application is running, whether a particular application is in a foreground of the terminal, etc.

In some embodiments, the terminal provides an indication of the second interaction mode. For example, the terminal provides an indication of the manner by which the user is to interact with the interface and/or the terminal. The terminal can display an indication of the second interaction mode and/or display an indication of how the user is to interact with the interface and/or the terminal (e.g., a manner by which the user can invoke a corresponding function). The terminal can provide an audio prompt indicating the second interaction mode, etc.

In some embodiments, the interface includes function information. The function information can include one or more of the following types of information: a current status of the function, operation guidance information (e.g., a user manual, etc.) corresponding to the function, and user execution results for the function. The function information can be used in connection with generating a precise second input. For example, the function information helps the user to generate a precise second input. Therefore, the function information can reduce the operational difficulty for the user by, for example, decreasing the number of human-machine voice interactions.

In some embodiments, the interface includes a widget. The widget can include a control element that is configured to respond to a slide event. For example, an input can be input to the touchscreen via toggling the control element of the widget with a touch input (e.g., a slide input). The widget can include: a guide container in which the control element is caused to slide. As an example, the guide container corresponds to an element such as a slider window and the control element is the button inside the slider window. The position of the control element in the guide container can characterize the current status of the function. For example, the guide container can have a left side corresponding to an "off" status of the corresponding function, and a right side corresponding to an "on" status of the corresponding function. If the control element is toggled to the left side of the guide container, the current status of the corresponding function is off, and if the control element is toggled to the right side of the guide container, the current status of the corresponding function is on.

In some embodiments, the position of the control element of the widget matches (e.g., corresponds to) the hand position of the user. The position of the control piece can be configured to correspond to a position at which the touch input is input to the touchscreen (e.g., a position at which the hand touches the screen). The position of the control element can correspond to the position projected onto the screen from the hand above the screen (e.g., a position at which the hand hovers above (or in front of) the screen). The correspondence between the position of the control element and the user's hand (or other input mechanism such as a stylus) enables the user to easily generate the second input.

At 230, a second input is obtained. In some embodiments, a terminal receives the second input from a user (e.g., based on a user interacting with the terminal). The second input can be one or more of a touch input, a voice input, a gesture, an input to a peripheral device, etc. The second input is obtained via a second interaction mode. The second interaction mode can be configured based on terminal settings, user preferences, historical information pertaining to use of the terminal or interaction with an interface, etc. The second interaction mode can be based at least in part on one or more of the first input, the first input interaction mode, an application context, a context of the terminal, etc.

In some embodiments, the second interaction mode is preset such. Accordingly, in response to the first input being received via the first interaction mode, the second interaction mode is configured. For example, the second interaction mode is determined based at least in part on the first input and/or the first interaction mode.

In some embodiments, the second interaction mode is determined in response to receiving the second input and in response to determining that the second input corresponds to a preset input according to any interaction mode that is different from the first interaction mode.

According to various embodiments, the second input is associated with an element (e.g., a link, a button, etc.) provided on the interface and/or information provided on the interface.

According to various embodiments, the interface is displayed before or after the second input is obtained.

According to various embodiments, if the first interaction mode is a voice interaction mode, the second interaction mode is determined to be a touch interaction mode if a touch input is input to the touchscreen (e.g., if the hand of the user touches said screen, etc.). For example, if the user issues a voice command and taps any position on the screen (e.g., with the user's hand), the position at which the screen is tapped serves as the basis to determine the target position for displaying an interface. The target position can be the position at which the hand touches the screen.

According to various embodiments, if the first interaction mode is a voice interaction mode, the second interaction mode is determined to be a gesture interaction mode if an input is received without a touch to the touchscreen (e.g., the input is not a touch input such as if a gesture input is received and the hand of the user does not touch said touchscreen). For example, if the user issues a voice command and causes the user's hand to hover over the screen, the hand-hovering position serves as the basis for determining the target position for displaying an interface. The target position can be the projection position of the hand on the screen.

At 240, a function is performed. In some embodiments, the function is performed in response to the second input being obtained (e.g., via the second interaction mode). As an example, the function corresponds to the second input and/or the second interaction mode. The terminal can store a mapping of inputs to functions, and the terminal can determine the function corresponding to the second input based at least in part on the mapping of inputs to functions. In some embodiments, the function performed in response to the second input is based at least in part on the second input and one or more of the interface, the first input, the first interaction mode, and the second interaction mode.

In some embodiments, a client (e.g., an app running on the terminal) performs at least part of process 200 of FIG. 2.

Process 200 of FIG. 2 can be performed while the device is in any state. In some embodiments, process 200 is performed when the terminal is in a particular corresponding state (e.g., a particular application context, a particular operating context, a particular environmental context, etc.). For example, the terminal, while displaying any page (or running any application), performs 220 in response to the obtaining of the first input at 210, and then the terminal performs 240 in response to the second input at 230.

According to various embodiments, a target function is determined corresponding to the first input. For example, 210 and/or 220 comprises determining the target function corresponding to the first input. In response to the target function being determined, the interface is configured and/or determined based at least in part on the target function. For example, the interface corresponding to the target function is displayed at the target position on the screen. According to various embodiments, different target functions correspond to the same or different interfaces. An interface corresponding to the target function can include: the widget such as a widget described above and a target function identifier (ID). The target function ID can include: the name, an icon, etc. The position of the control element in the guide container can be determined based at least in part on the current parameter values corresponding to the target function.

At 240, a function corresponding to the interface is performed in response to the second input. For example, the second input corresponds to a touch input, and a corresponding to the interface is triggered and executed. As another example, if the interface corresponds to a volume control interface, and the second input corresponds to a touch input, and a volume control is triggered and executed.

The second input can be a sliding of the control element in a widget provided on the interface. For example, if the interface widget includes a control element and a guide container, the user can input the second input in a manner that controls the position of the control element within the guide container. An example of the second input can be a slide input with respect to the control element. In some embodiments, the direction of the guide container matches the slide direction of the control piece. For example, the guide container can be an oblong, and the slide direction can be horizontal left to right or right to left. As another example, the guide container is a rectangle having a longer side configured to run horizontally. According to various embodiments, the slide direction is based at least in part on the guide container and can be any direction, such as horizontal, vertical, up-down, or left-right. The second input obtained at 230 can correspond to an input with the slide direction. The implementation of a control element and a guide container can reduce the difficulty for a user to learn and memorize the second input and can improve second input accuracy.

As an example, if the screen is parallel to the face of the user (e.g., if the user is looking to the screen), the directions of the guide container include: the left-right direction (e.g., the guide container is an oblong shape with longer dimension extending horizontally). According to such an example, the gesture corresponding to the second input can thus be a swipe in a left-right direction. The second input can also be a voice command corresponding to an instruction to slide the control element in a particular direction (or from one point to another point). For example, a gesture direction that extends from left to right can cause the control element to slide from left to right. As another example, a gesture direction that extends from right to left can cause the control piece to slide from right to left. Of course, the gesture direction corresponding to the second input can differ from the slide direction. For example, a gesture direction that goes from left to right may cause the control piece to slide from up to down. The movement of the control element within (or along) the guide container can control a characteristic of the terminal or of a service. For example, the movement of the control element can change the volume (e.g., a slide of the control element in a rightwards direction can progressively increase a volume of playback, a slide of the control element in a leftwards direction can progressively decrease a volume of playback, etc.).

The widget described above (e.g., that includes a control element) is merely an optional embodiment of an interface. The control element can be implemented in various forms (e.g., a button, a checkbox, a knob that can be turned, etc.). In some embodiments, the interface includes a plurality of function options. The plurality of function options can be arranged sequentially. As an example, the plurality of function options can be implemented in connection with a plurality of control elements each of which corresponds to a different one of the plurality of function options. The selected function option (e.g., of the plurality of function options) serves as the target function. According to various embodiments, the target function is selected based at least in part on the second input. For example, the function corresponding to the function option selected by (or triggered by) the second input is deemed the target function. As an example, volume is differentiated into a plurality of function options in order of high to low. The plurality of function options can include: function option 1, function option 2, . . . function option N (where N is a natural number greater than 1). Thus, the user can perform an adjustment on one of the target function options via inputting the second input.

In some embodiments, the control element or target function option varies with the second input. For example, the control element or the target function option can vary based at least in part on the second input (e.g., a type of second input or an interaction mode via which the second input is input). As an example, if the second input is touch input, the control element moves synchronously (or contemporaneously) with a hand position of the user's hand. As another example, if the second input is a voice input or a gesture input, a single voice input or the gesture input corresponding to a time period T can be determined and a mapping relationship between the single voice input or gesture input and the slide unit of the control element or target function option can be determined. The control element or target function option can thereby be updated based at least in part on the single voice input or the gesture input.

In some embodiments, the unit measuring the amount of sliding of the control element (also referred to as the slide unit) corresponding to a single voice input is Δa. Accordingly, a shift of Δa in the control element or the target function option (e.g., an amount a volume is changed based on a single input) can be performed based at least in part on the single voice input. The single voice input can indicate a direction of the shift of Δa to be implemented with respect to the control element or the target function option. For example, in the case of the corresponding function being volume controlled, a voice input indicating that the volume is to be increased can cause the control element or the target function option to be shifted in a single slide unit of Δa (e.g., the volume can be increased by an amount corresponding to Δa).

In some embodiments, the slide unit corresponding to a gesture input within the time period T is a shift of Δb. Accordingly, a shift of t×Δb/T can be performed with respect to the control piece or the target function option based at least in part on the slide direction and time t of the gesture input.

In some embodiments, a unit according to which a characteristic of the terminal (e.g., a volume, a brightness, etc.) is changed can be set and the change in the corresponding characteristic can be in increments of the unit based at least in part on the second input.

According to various embodiments, if the second interaction mode is a gesture interaction mode, the performing the function (e.g., in response to the second input) such as the specific function corresponding to the interface includes performing the target function corresponding to a function-selecting gesture in response to the function-selecting gesture (e.g., [what?] being input by the user).

The function-selecting gesture can be associated with invoking execution of the function corresponding to the interface. For example, a gesture direction that goes from left to right causes the control element to slide from left to right and thereupon to implement an "adjust up" function. As another example, a gesture direction that goes from right to left causes the control element to slide from right to left and thereupon to implement an "adjust down" function.

In some embodiments, the orientation of the function selecting gesture (or the control element) can be based at least in part on the position at which the function information is provided (e.g., displayed). As an example, the terminal stores a mapping of the display position corresponding to the function information and the orientation of the function-selecting gesture. Accordingly, the displayed function information can indicate (or be indicative) to the user of the orientation of the function-selecting gesture. The relationship between the orientation of the function selecting gesture (or the control element) and the function information or the position at which the function information is provided can further reduce the difficulty for the user to learn and memorize the gesture associated with invoking a desired function while increasing the convenience of gesture interactions.

The orientation of the function-selecting gesture can include direction. The display position corresponding to the function information can be used to indicate the direction of the function-selecting gesture. For example, the display position corresponding to the function information is provided on the left side of the widget. According to such an example, the direction of the function-selecting gesture is left (e.g., a leftward shift or a leftward rotation). As another example, the display position corresponding to the function information is provided on the right side of the widget. According to such an example, the direction of the function-selecting gesture is right (e.g., a rightward shift or a rightward rotation).

According to various embodiments, the display position corresponding to the function information is mapped to the orientation of the function-selecting gesture. In some embodiments, determining a mapping of display position corresponding to the function information to the orientation of the function-selecting gesture includes determining the display position corresponding to the orientation of the function-selecting gesture based at least in part on the orientation of the function-selecting gesture and the mapping relationship between the function and the function-selecting gesture. As an example, if Function 1 corresponds to Function-selecting Gesture 1, then Display Position B corresponding to Function 1 information can be determined based on Orientation A of Function-selecting Gesture 1, wherein Orientation A and Display Position B match each other. For example, if Orientation A is a leftward shift direction, Display Position B may be a position on the left side of the screen.

In some embodiments, the function information is located on the edge of the widget. The edge can include at least one of the following: an upper edge, a lower edge, a left edge, and a right edge. Position information corresponding to the edge can indicate to the user the orientation of the function-selecting gesture.

In an embodiment of the present application, the function information may include: text and/or icons. The text can correspond to a function keyword (e.g., the name of the function, a description of the function, etc.). The icon can be an icon that is used to refer to the meaning of the function. For example, the icon for the "adjust up" function icon is "→", and the "adjust down" function icon is "←".

In some embodiments, display of the interface is stopped in response to a context and/or in response to one or more conditions being satisfied. For example, display of the interface occurs in response to a determination that a hand action by the user satisfies a precondition. As another example, display of the interface occurs in response to a determination that a hand gesture corresponds to a gesture that is mapped to a corresponding function, etc.

As an example, if the second interaction mode is the gesture interaction mode, the display of the interface is stopped (e.g., the corresponding widget is closed, minimized, etc.) if a preset gesture is detected. In some embodiments, a preset gesture in response to which the display of the interface is stopped is different from the function-selecting gesture. For example, the preset gesture in response to which the display of the interface is stopped can be a gesture mapped to switch applications, to close the interface, etc. Accordingly, confusion with respect to the gestures that cause the display of the interface to be stopped and the gestures that can invoke a function to be performed is minimized or avoided. Further, the distinction between the gestures can raise operational accuracy.

As an example, if the second interaction mode is a touch interaction mode, then in response to a determination that the hand or input device (e.g., stylus, etc.) exits the field of view of the one or more sensors of the terminal, or leaves the positions corresponding to positions on the screen, the display of the interface is stopped (e.g., the corresponding widget may be closed).

According to various embodiments, a plurality of interaction modes are implemented in connection with performing a desired function. For example, a first interaction mode and a second interaction mode are implemented in connection with performing a function. The first input corresponding to the first interaction mode is used in connection with displaying of an interface. The second input corresponding to the second interaction mode is used in connection with invoking execution of a function corresponding to the interface. Various embodiments combine the advantages of the first interaction mode and the second interaction mode and avoid the defects of implementing only one of the first interaction mode or the second interaction mode to cause the function to be performed. Various embodiments implement invocation of a function through a first input and a second input and thus may reduce operational difficulty for the user while improving operational efficiency for the user.

According to various embodiments, the interface target position on the screen matches the position of the hand of the user. Thus, relatedness between the user (e.g., the hand of the user) and the interface is increased, thereby providing an effect according to which the interface is provided at a position corresponding to a position of the hand. As a result, hand operations become more convenient, and the user experience is improved.

Figure 3:
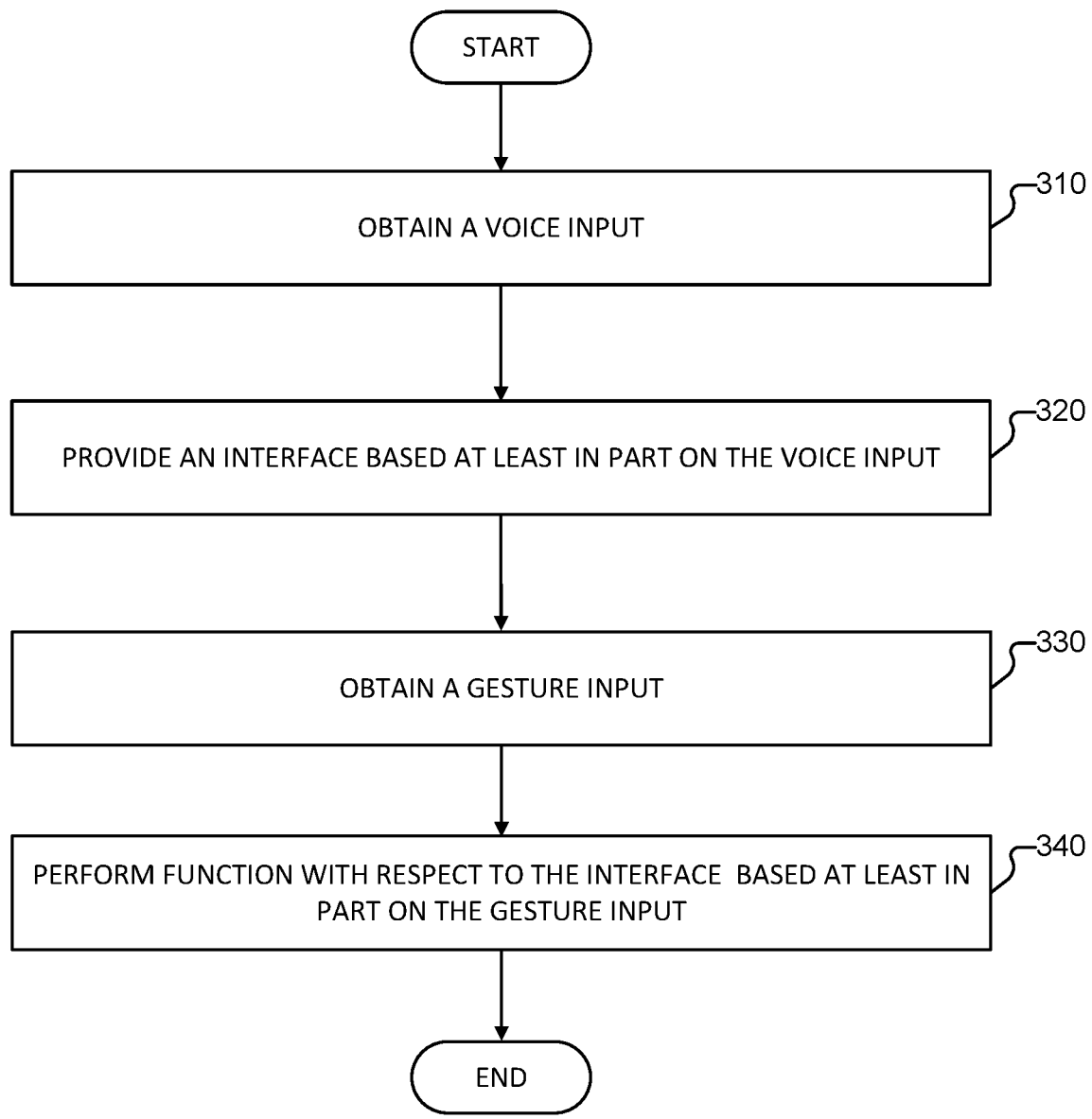
FIG. 3 is a flowchart of a data processing method according to various embodiments of the present application.

FIG. 3 is a flowchart of a data processing method according to various embodiments of the present application.

Referring to FIG. 3, process 300 for processing data is provided. Process 300 can implement invocation of a function or control of a terminal. Process 300 can be implemented in connection with process 200 of FIG. 2. For example, process 300 can be implemented by process 200 of FIG. 2. Process 300 can be implemented in connection with interaction 400 of FIG. 4, interaction 500 of FIG. 5, interaction 600 of FIG. 6, and/or interaction 700 of FIG. 7. Process 300 can be implemented at least in part by system 100 of FIG. 1 and/or computer system 1100 of FIG. 11.

At 310, a voice input is obtained. In some embodiments, 310 is implemented by 210 of process 200 of FIG. 2. In some embodiments, a terminal receives the first input from a user (e.g., based on a user interacting with the terminal). The first input is obtained via a first interaction mode. The first interaction mode can be configured based on terminal settings, user preferences, historical information pertaining to use of the terminal or interaction with an interface, etc. The first interaction mode is a voice interaction mode.

At 320, an interface is provided. In some embodiments, the interface is provided based at least in part on the voice input. In some embodiments, 320 is implemented by 220 of process 200 of FIG. 2. For example, the terminal displays the interface on a display (e.g., a touchscreen). According to various embodiments, the interface is provided based at least in part on the first input. For example, in response to receiving the first input, the terminal obtains the interface. The interface can be preset or preconfigured before the terminal receives the first input, or the interface can be configured or generated based at least in part on the first input. For example, the interface can be configured based on a particular command associated with the first input, a type of input corresponding to the first input, a type of command associated with the first input, a first interaction mode via which the first input is received, etc.

According to various embodiments, the interface is provided at a target position. The target position can be determined based at least in part on the user. For example, the target position matches a position of the hand of the user.

At 330, a gesture input is obtained. In some embodiments, 330 is implemented by 230 of process 200 of FIG. 2. In some embodiments, a terminal receives the second input from a user (e.g., based on a user interacting with the terminal). The second input is obtained via a second interaction mode. The second interaction mode can be configured based on terminal settings, user preferences, historical information pertaining to use of the terminal or interaction with an interface, etc. The second interaction mode can be based at least in part on one or more of the first input, the first input interaction mode, an application context, a context of the terminal, etc. The second interaction mode is a gesture interaction mode.

At 340, a function is performed. In some embodiments, the function is performed based at least in part on the gesture input. The function that is performed can correspond to a function that selection of which is provided by the interface. In some embodiments, 340 is implemented by 240 of process 200 of FIG. 2. In some embodiments, the function is performed in response to the second input being obtained (e.g., via the second interaction mode). As an example, the function corresponds to the second input and/or the second interaction mode. The terminal can store a mapping of inputs to functions, and the terminal can determine the function corresponding to the second input based at least in part on the mapping of inputs to functions. In some embodiments, the function performed in response to the second input is based at least in part on the second input and one or more of the interface, the first input, the first interaction mode, and the second interaction mode.

By combining the naturalness of speech with the conciseness of gestures, various embodiments overcome the problem of lengthy interactions in instances when only voice interaction modes are implemented, and overcome the problem of difficulties associated with learning and memorization difficulties in instances when only gesture interaction modes are implemented. Accordingly, in comparison to the related art, various embodiments are easier for the user to implement functions. The voice input can be integrated with remote gesture input (e.g., both the voice interaction mode and the gesture interaction mode can be implemented in connection with performing a desired function), wherein an interface is called up by one or more voice inputs. In some embodiments, the interface is called up in response to a single voice input. Accordingly, a number of voice interactions to navigate an application or a menu of a terminal to invoke an interface is reduced.

According to various embodiments, gesture inputs can be quickly and easily generated in connection with the gesture interaction mode in order to implement (e.g., invoke execution of) the function. Different types of functions displayed in different interface can share same gesture. Accordingly, a user has less difficulty in learning and memorizing gestures. As an example, different types of functions such as volume, brightness, saturation, contrast, temperature, and wind speed displayed in different interfaces can has the same gesture. In some embodiments, gestures mapped to a corresponding function are further based on the first input.

In some embodiments, the target position at which the interface is provided on the screen is based at least in part on the user. For example, the target position matches the position of the hand of the user (e.g., a position of the hand in relation to one or more sensors or in relation to the terminal). Thus, relatedness between the user (e.g., the hand of the user) and the interface is increased, thereby enabling the user to experience an effect in which the interface is positioned in accordance with a position of the hand. As a result, hand operations become more convenient, and the user experience is improved.

Figure 4:
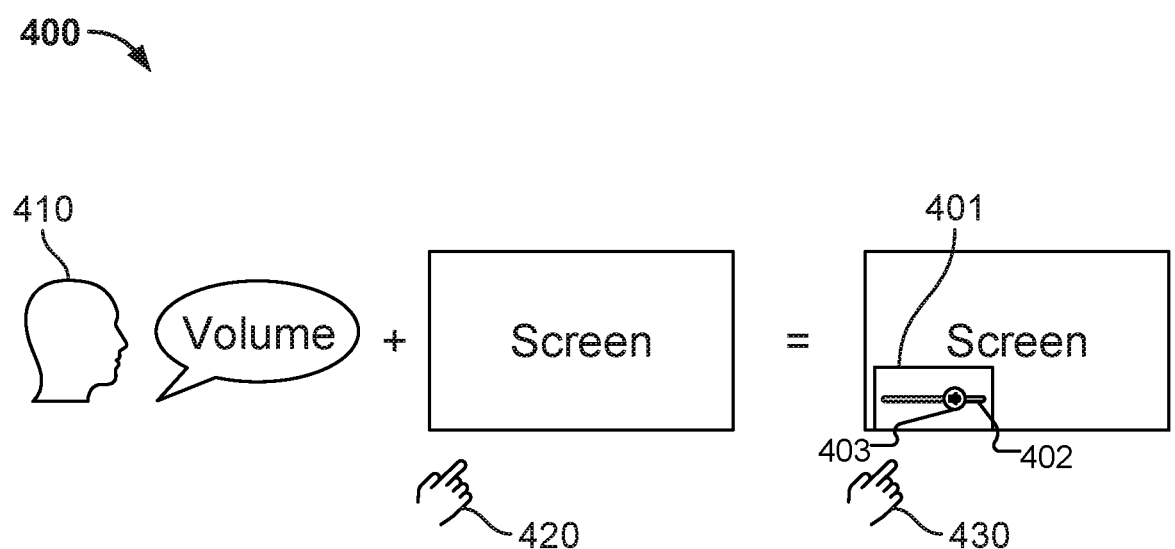
FIG. 4 is a diagram of an interaction between a user and a terminal according to various embodiments of the present application.

FIG. 4 is a diagram of an interaction between a user and a terminal according to various embodiments of the present application.

Referring to FIG. 4, interaction 400 between a user and a terminal is provided. Interaction 400 can be implemented in connection with invocation of a function or control of a terminal. Interaction 400 can be implemented in connection with process 200 of FIG. 2 and/or process 300 of FIG. 3. For example, interaction 400 can be implemented by process 200 of FIG. 2 and/or process 300 of FIG. 3. Interaction 400 can be implemented at least in part by system 100 of FIG. 1 and/or computer system 1100 of FIG. 11.

As illustrated in FIG. 4, a flow diagram of an interaction 400 between a user and a terminal is provided. At 410, the user inputs a first input (e.g., a voice input). If a voice input (e.g., "volume") is received from a user, the target function is determined. For example, if the voice input corresponds to "volume" or "change the volume," the target function can be determined to be a "volume function," etc. The target function is determined so as to correspond to the voice input. In some embodiments, the target function is determined based on a query of one or more keywords comprised in the voice input performed with respect to a mapping of keywords to functions. In addition, at 420, a hand hovers over the front of the screen. In response to a determination that a hand is detected hovering in front of the screen, the target position is determined according to the hand position. Interface 401 is configured based at least in part on the voice input and/or the position of the hand that is detected to be hovering over the screen. At 430, interface 401 is displayed at the target position on the screen. Interface 401 can include: a widget and an audio icon. The widget includes a control element 403 and a guide container 402, and the control element is configured to slide within the guide container. The user can input a gesture input or a touch input to slide the control element within the guide container to invoke a control function (e.g., to control the volume). According to interaction 400, the hand of the user is detected to be hovering over a bottom left area of the screen at 420, and as a result, interface 401 is provided at a bottom left corner of the screen at 430.

Figure 5:
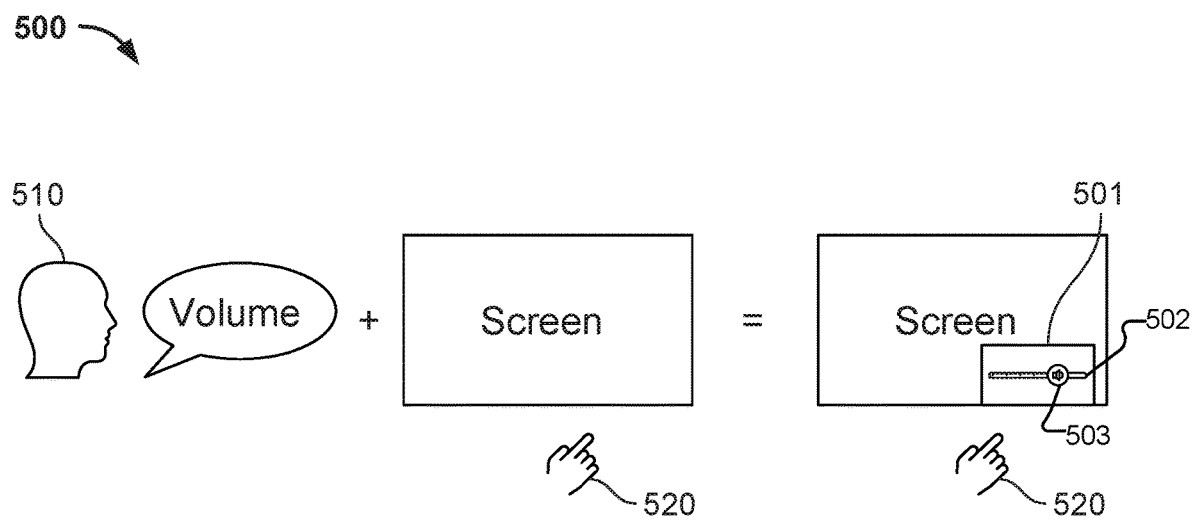
FIG. 5 is a diagram of an interaction between a user and a terminal according to various embodiments of the present application.

FIG. 5 is a diagram of an interaction between a user and a terminal according to various embodiments of the present application.

Referring to FIG. 5, interaction 500 between a user and a terminal is provided. Interaction 500 can be implemented in connection with invocation of a function or control of a terminal. Interaction 500 can be implemented in connection with process 200 of FIG. 2 and/or process 300 of FIG. 3. For example, interaction 500 can be implemented by process 200 of FIG. 2 and/or process 300 of FIG. 3. Interaction 500 can be implemented at least in part by system 100 of FIG. 1 and/or computer system 1100 of FIG. 11.

As illustrated, a flow diagram of an interaction 500 between a user and a terminal is provided. At 510, the user inputs a first input (e.g., a voice input). If a voice input (e.g., "volume") is received from a user, the target function is determined. For example, if the voice input corresponds to "volume" or "change the volume," the target function can be determined to be a "volume function," etc. The target function is determined so as to correspond to the voice input. In some embodiments, the target function is determined based on a query of one or more keywords comprised in the voice input performed with respect to a mapping of keywords to functions. In addition, at 520, a hand hovers over the front of the screen. In response to a determination that a hand is detected hovering in front of the screen, the target position is determined according to the hand position. Interface 501 is configured based at least in part on the voice input and/or the position of the hand that is detected to be hovering over the screen. At 530, interface 501 is displayed at the target position on the screen. Interface 501 includes a widget and an audio icon. The widget includes a control element 503 and a guide container 502, and the control element is configured to slide within the guide container. The user can input a gesture input or a touch input to slide the control element within the guide container to invoke a control function (e.g., to control the volume). According to interaction 500, the hand of the user is detected to be hovering over a bottom right area of the screen at 520, and as a result, interface 501 is provided at a bottom right corner of the screen at 530.

A difference between interaction 500 and interaction 400 of FIG. 4 includes the target position of interface 501 being different from the target position of interface 401. Specifically, the target position of interface 401 is lower-left, and the target position of interface 501 is lower-right. According to various embodiments, the target positions are determined based at least in part on the position of the hand. In some embodiments, the target positions are determined based at least in part on the projection positions of the hand with respect to the screen. According to various embodiments, the position of hand is detected by camera or some other sensors, and the projection of hand on the screen is the projection position.

Figure 6:
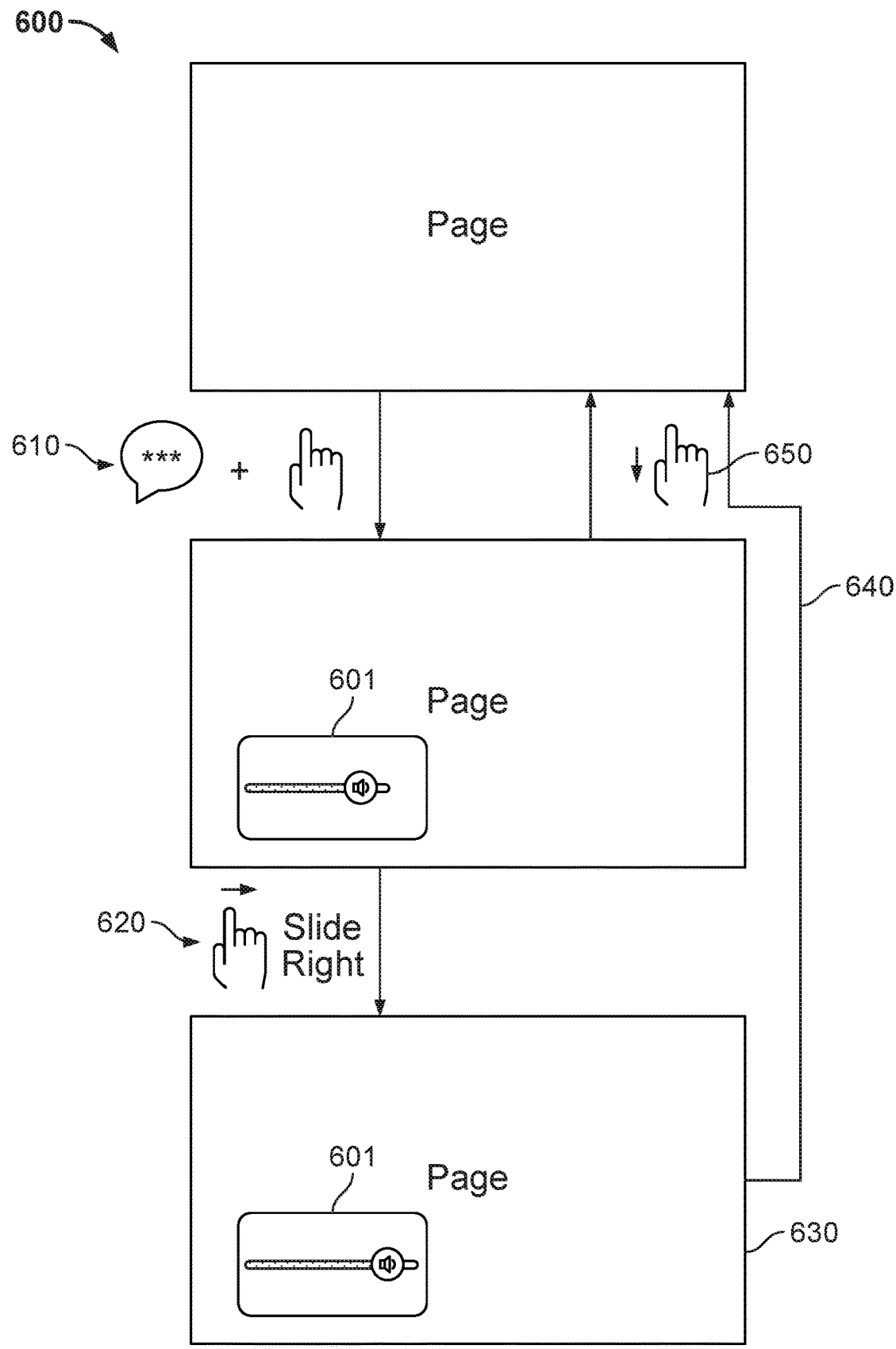
FIG. 6 is a diagram of an interaction between a user and a terminal according to various embodiments of the present application.

FIG. 6 is a diagram of an interaction between a user and a terminal according to various embodiments of the present application.

Referring to FIG. 6, interaction 600 between a user and a terminal is provided. Interaction 600 can be implemented in connection with invocation of a function or control of a terminal. Interaction 600 can be implemented in connection with process 200 of FIG. 2 and/or process 300 of FIG. 3. For example, interaction 600 can be implemented by process 200 of FIG. 2 and/or process 300 of FIG. 3. Interaction 600 can be implemented at least in part by system 100 of FIG. 1 and/or computer system 1100 of FIG. 11.

As illustrated, a flow diagram of an interaction 600 between a user and a terminal is provided. At 610, the user inputs a first input (e.g., a voice input). If a voice input (e.g., "volume") is received from the user while a page (e.g., a user interface screen) is being provided by the terminal, the voice command is determined to be a target function. For example, in response to receiving the voice input while the terminal provides any page (e.g., a navigation page, a music page, a media playback page, an application page, a gaming page, etc.), the terminal determines that the target function corresponds to the voice input. For example, if the voice input corresponds to "volume" or "change the volume," the target function can be determined to be a "volume" function, etc. The target function is determined so as to correspond to the voice input. In addition, the target position is determined based at least in part on a position of the user (e.g., a position of the hand of the user). In response to determining the target function and a position of the user (e.g., a target position of the interface), the terminal invokes interface 601 and provides interface 601 at the target position on the screen.

Interface 601 can include a widget and an audio icon. The widget can include a control element and a guide container. The widget is configured such that the control element can slide within the guide container. According to various embodiments, the widget is configured to allow the control element to slide along a path (e.g., a horizontal line, a vertical line, etc.). Interaction 600 illustrates the widget configured to allow for the control element to be adjusted (e.g., slide) in a horizontal path. If a rightward slide operation is received (e.g., from the user), the control piece may be slid rightward. In some embodiments, the widget and/or interface is used to implement the volume adjustment function (e.g., via control of the control element).

The rightward slide operation described above can be implemented in the gesture interaction mode or the touch interaction mode. In some embodiments, in response to interface 601 being displayed, the terminal determines whether a gesture input or touch input is received and that such gesture input or touch input satisfies one or more criteria (e.g., a gesture input corresponding to a downward swipe, etc.). For example, one or more predefined inputs can be mapped to functions different from the target function, such as exiting out of control of the target function, etc. At 650, if the terminal determines that the gesture input or touch input is received and that such gesture input or touch input satisfies one or more criteria corresponding to exiting control of the target function, etc., then display of interface 601 is stopped. For example, at 650, if a downward movement gesture is detected, interface 601 is closed.

At 620, the terminal determines that a gesture input or touch input is received, and that such gesture input or touch input corresponds to an input to control a slide of the control element to the right. For example, the touch input is a touch and drag of the control element in the rightwards direction. As another example, a gesture input is a gesture of the hand of the user moving from a left position to a rightwards position. At 630, in response to determining that a gesture input or touch input is received, and that such gesture input or touch input corresponds to an input to control a slide of the control element to the right, the corresponding function is provided (e.g., the volume is controlled such as to increase the volume).

At 630, while interface 601 is being displayed, the terminal determines whether a gesture input or touch input is received and that such gesture input or touch input satisfies one or more criteria (e.g., a gesture input corresponding to a downward swipe, etc.). For example, one or more predefined inputs can be mapped to functions different from the target function, such as exiting out of control of the target function, etc. At 640, if the terminal determines that the gesture input or touch input is received and that such gesture input or touch input satisfies one or more criteria corresponding to exiting control of the target function, etc., then display of interface 601 is stopped. For example, at 640, if a downward movement gesture is detected, interface 601 is closed.

Please note that the rightward slide operation described above is merely an example of a gesture input. Various gestures can also include: vertical shift operations, circling operations, rotating operations, as well as other operations.

Figure 7:
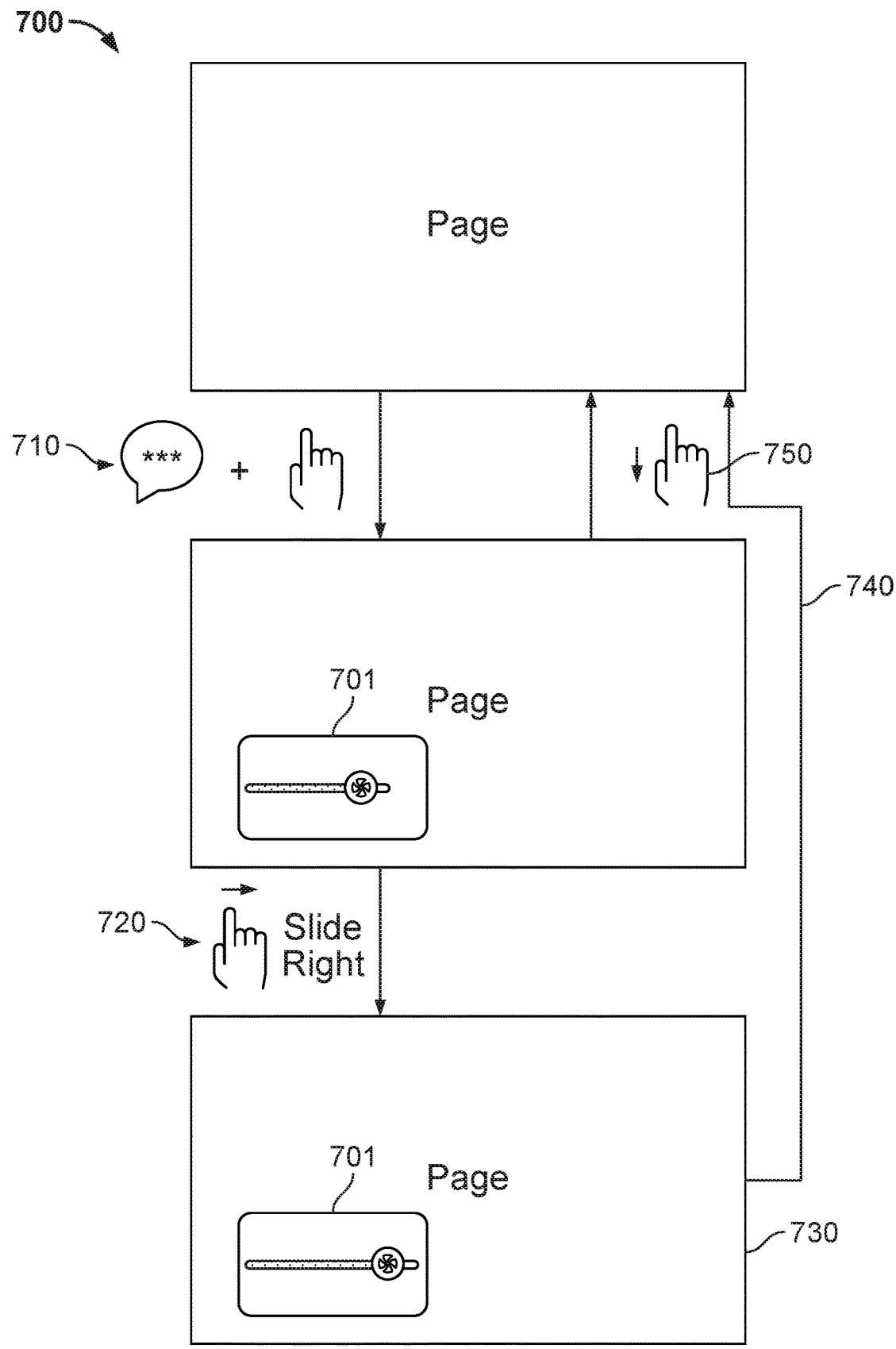
FIG. 7 is a diagram of an interaction between a user and a terminal according to various embodiments of the present application.

FIG. 7 is a diagram of an interaction between a user and a terminal according to various embodiments of the present application.

Referring to FIG. 7, interaction 700 between a user and a terminal is provided. Interaction 700 can be implemented in connection with invocation of a function or control of a terminal. Interaction 700 can be implemented in connection with process 200 of FIG. 2 and/or process 300 of FIG. 3. For example, interaction 700 can be implemented by process 200 of FIG. 2 and/or process 300 of FIG. 3. Interaction 700 can be implemented at least in part by system 100 of FIG. 1, and/or computer system 1100 of FIG. 11.

As illustrated, a flow diagram of an interaction 700 between a user and a terminal is provided. At 710, the user inputs a first input (e.g., a voice input). If a voice input (e.g., "fan speed") is received from the user while a page (e.g., any page) is being provided by the terminal, the voice command is determined to be a target function. For example, in response to receiving the voice input while the terminal provides any page (e.g., a navigation page, a music page, a media playback page, an application page, a gaming page, etc.), the terminal determines that the target function corresponds to the voice input. For example, if the voice input corresponds to "fan speed" or "change the fan," the target function can be determined to be a "fan speed," etc. The target function is determined so as to correspond to the voice input. In addition, the target position is determined based at least in part on a position of the user (e.g., a position of the hand of the user). In response to determining the target function and a position of the user (e.g., a position of the user's hand, which corresponds to a target position of the interface), the terminal invokes interface 701 and provides interface 701 at the target position on the screen. Interface 701 can include: a widget and a fan speed icon. The widget can include: a control element and a guide container. The widget can be configured such that the control element can slide within the guide container. According to various embodiments, the widget is configured to allow the control element to slide along a path (e.g., a horizontal line, a vertical line, etc.). Interaction 700 illustrates the widget configured to allow for the control element to be adjusted (e.g., slide) in a horizontal path. If a rightward slide operation is received (e.g., from the user), the control piece may be slid rightward. In some embodiments, the widget and/or interface is used to implement the fan speed function (e.g., via control of the control element).

The rightward slide operation described above can be implemented in the gesture interaction mode or the touch interaction mode. In some embodiments, in response to interface 701 being displayed, the terminal determines whether a gesture input or touch input is received and that such gesture input or touch input satisfies one or more criteria (e.g., a gesture input corresponding to a downward swipe, etc.). For example, one or more predefined inputs can be mapped to functions different from the target function, such as exiting out of control of the target function, etc. At 750, if the terminal determines that the gesture input or touch input is received and that such gesture input or touch input satisfies one or more criteria corresponding to exiting control of the target function, etc., then display of interface 701 is stopped. For example, at 750, if a downward movement gesture is detected, interface 701 is closed.

At 720, the terminal determines that a gesture input or touch input is received, and that such gesture input or touch input corresponds to an input to control a slide of the control element to the right. For example, the touch input is a touch and drag in the rightwards direction. As another example, a gesture input is a gesture of the hand of the user moving from a left position to a rightwards position. At 730, in response to determining that a gesture input or touch input is received, and that such gesture input or touch input corresponds to an input to control a slide of the control element to the right, the corresponding function is provided (e.g., the fan speed is controlled such as to increase the fan speed).

At 730, while interface 701 is being displayed, the terminal determines whether a gesture input or touch input is received and that such gesture input or touch input satisfies one or more criteria (e.g., a gesture input corresponding to a downward swipe, etc.). For example, one or more predefined inputs can be mapped to functions different from the target function, such as exiting out of control of the target function, etc. At 740, if the terminal determines that the gesture input or touch input is received and that such gesture input or touch input satisfies one or more criteria corresponding to exiting control of the target function, then display of interface 701 is stopped. For example, at 740, if a downward movement gesture is detected, interface 701 is closed.

Please note that the rightward slide operation described above is merely an example of a gesture input. Various gestures can include: vertical shift operations, circling operations, rotating operations, or other operations.

Various embodiments make integrated use of voice input and remote gesture input, such that an interface is invoked in response to a single voice input. Accordingly, a number of voice interactions can be reduced.

Various embodiments implement the function corresponding to the interface quickly and easily via a gesture input that is input in the gesture interaction mode. The displayed interface can cause different types of functions to be mapped to a same gesture. For example, a mapping of gestures to types of functions or of gestures to functions can be a one-to-many mapping. As a result of fewer gesture patterns being used to implement a particular number of functions as compared to the related art, users experience less difficulty in learning and memorizing gestures.

According to various embodiments, the target position at which the interface is provided on the screen matches a position of the user (e.g., a position of the user with respect to the terminal). For example, the target position at which the interface is provided on the screen matches a position of the hand of the user. Thus, relatedness between the user (e.g., the hand of the user) and the interface is increased, and an effect in which the interface is provided to correspond to a location of the hand of the user is implemented. As a result, hand operations become more convenient, and the user experience is improved.

Figure 8:
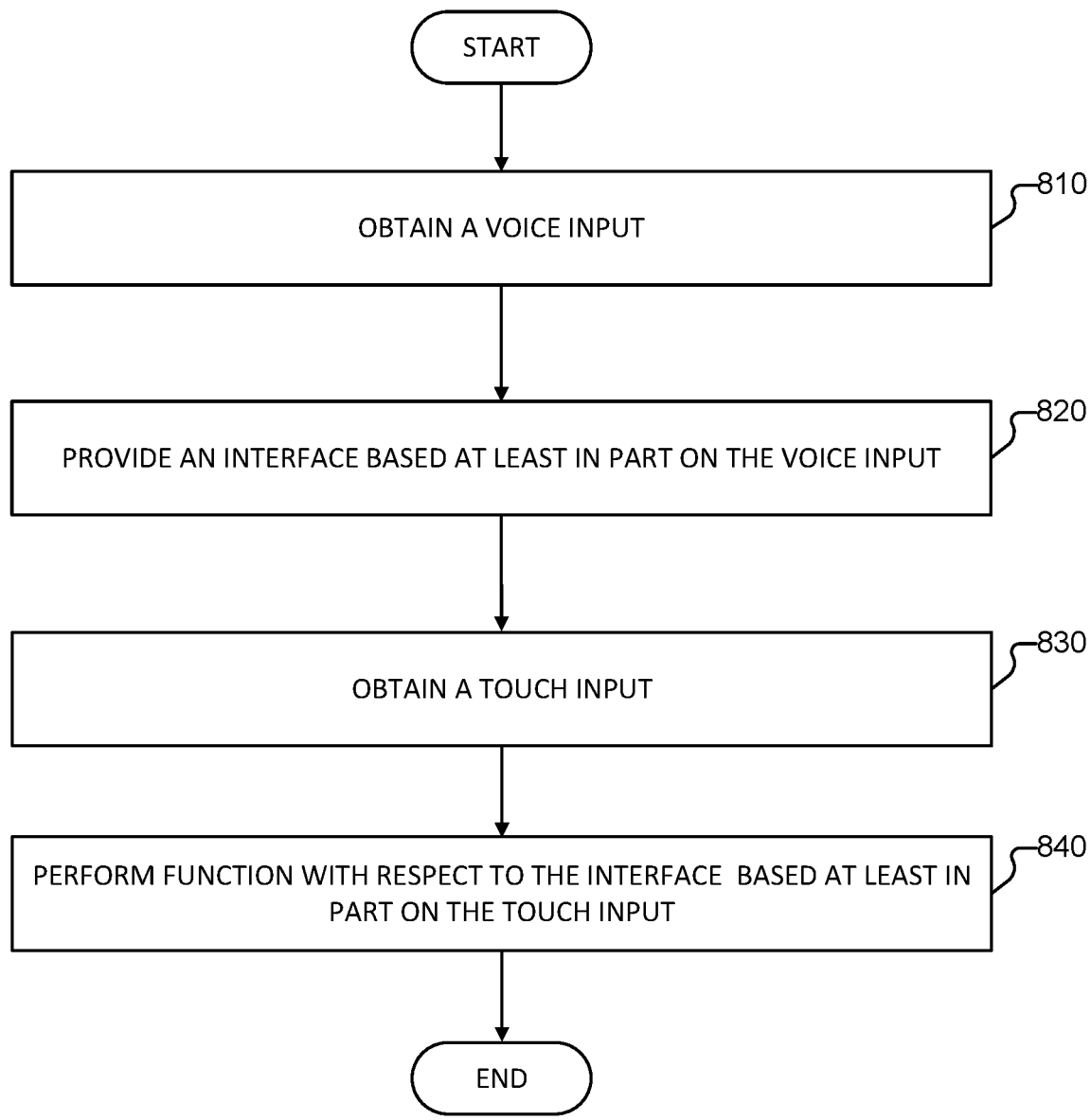
FIG. 8 is a flowchart of a data processing method according to various embodiments of the present application.

FIG. 8 is a flowchart of a data processing method according to various embodiments of the present application.

Referring to FIG. 8, process 800 for processing data is provided. Process 800 can implement invocation of a function or control of a terminal. Process 800 can be implemented in connection with process 200 of FIG. 2. For example, process 800 can be implemented by process 200 of FIG. 2. Process 800 can be implemented in connection with interaction 900 of FIG. 9 and/or interaction 1000 of FIG. 10. Process 800 can be implemented at least in part by system 100 of FIG. 1 and/or computer system 1100 of FIG. 11.

At 810, a voice input is obtained. In some embodiments, 810 is implemented by 210 of process 200 of FIG. 2. In some embodiments, a terminal receives the first input from a user (e.g., based on a user interacting with the terminal). The first input is obtained via a first interaction mode. The first interaction mode can be configured based on terminal settings, user preferences, historical information pertaining to use of the terminal or interaction with an interface, etc. The first interaction mode is a voice interaction mode.

At 820, an interface is provided. In some embodiments, the interface is provided based at least in part on the voice input. In some embodiments, 820 is implemented by 220 of process 200 of FIG. 2. For example, the terminal displays the interface on a display (e.g., a touchscreen). According to various embodiments, the interface is provided based at least in part on the first input. For example, in response to receiving the first input, the terminal obtains the interface. The interface can be preset or preconfigured before the terminal receives the first input, or the interface can be configured or generated based at least in part on the first input. For example, the interface can be configured based on a particular command associated with the first input, a type of input corresponding to the first input, a type of command associated with the first input, a first interaction mode via which the first input is received, etc.

According to various embodiments, the interface is provided at a target position. The target position can be determined based at least in part on the user. For example, the target position matches a position of the hand of the user.

At 830, a touch input is obtained. In some embodiments, 830 is implemented by 230 of process 200 of FIG. 2. In some embodiments, a terminal receives the second input from a user (e.g., based on a user interacting with the terminal). The second input is obtained via a second interaction mode. The second interaction mode can be configured based on terminal settings, user preferences, historical information pertaining to use of the terminal or interaction with an interface, etc. The second interaction mode can be based at least in part on one or more of the first input, the first input interaction mode, an application context, a context of the terminal, etc. The second interaction mode is a touch interaction mode.

The touch input can be a tap, a touch and hold, a swipe, etc. Various touch inputs can be implemented in connection with invoking execution of a corresponding function.

At 840, a function is performed. In some embodiments, the function is performed based at least in part on the touch input. The function that is performed can correspond to a function that selection of which is provided by the interface. In some embodiments, 840 is implemented by 240 of process 200 of FIG. 2. In some embodiments, the function is performed in response to the second input being obtained (e.g., via the second interaction mode). As an example, the function corresponds to the second input and/or the second interaction mode. The terminal can store a mapping of inputs to functions, and the terminal can determine the function corresponding to the second input based at least in part on the mapping of inputs to functions. In some embodiments, the function performed in response to the second input is based at least in part on the second input and one or more of the interface, the first input, the first interaction mode, and the second interaction mode.

Various embodiments implement a corresponding function based at least in part on a combination of a voice input and a touch input. By combining the naturalness of speech with the conciseness of touch, various embodiments overcome the problem of the related art according to which interactions are lengthy because the user-terminal interactions are performed using only voice interaction modes (e.g., without the integration of a plurality of interaction modes), and the problem of long operational paths associated with user-terminal interactions are performed using only a touch interaction mode. Accordingly, various embodiments facilitate the invocation of functions by a user with relative ease as compared to the related art.

Figure 9:
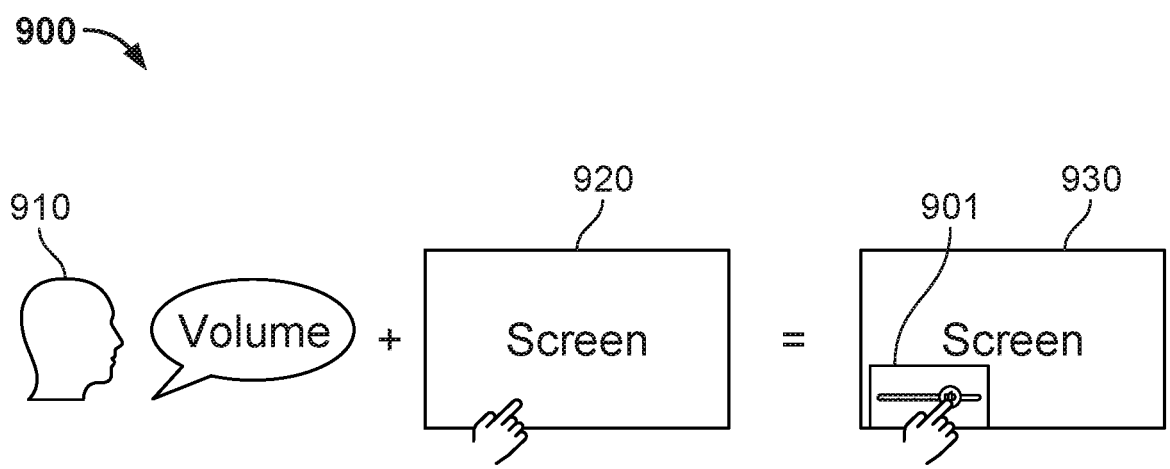
FIG. 9 is a diagram of an interaction between a user and a terminal according to various embodiments of the present application.

FIG. 9 is a diagram of an interaction between a user and a terminal according to various embodiments of the present application.

Referring to FIG. 9, interaction 900 between a user and a terminal is provided. Interaction 900 can be implemented in connection with invocation of a function or control of a terminal. Interaction 900 can be implemented in connection with process 200 of FIG. 2 and/or process 800 of FIG. 8. For example, interaction 900 can be implemented by process 200 of FIG. 2 and/or process 800 of FIG. 8. Interaction 900 can be implemented at least in part by system 100 of FIG. 1 and/or computer system 1100 of FIG. 11.

As illustrated in FIG. 9, a flow diagram of an interaction 900 between a user and a terminal is provided. At 910, the user inputs a first input (e.g., a voice input). If a voice input (e.g., "volume") is received from a user, the target function is determined. For example, if the voice input corresponds to "volume" or "change the volume," the target function can be determined to be a "volume function," etc. The target function is determined so as to correspond to the voice input. In some embodiments, the target function is determined based on a query of one or more keywords comprised in the voice input performed with respect to a mapping of keywords to functions. In addition, at 920, a touch input is made to the terminal. For example, the touch input is input via a hand of a user tapping on a screen. The terminal can detect a touch input in response to a touchscreen of the terminal being touched. In response to a determination that a touch input is made to the touchscreen (e.g., the hand of the user taps the touchscreen), the target position is determined according to the hand position (e.g., according to a position at which the touchscreen is tapped). Interface 901 is configured based at least in part on the voice input and/or the position of the hand (e.g., the location of the touchscreen at which the touch input is input). At 930, interface 901 is displayed at the target position on the screen. Interface 901 can include: a widget and an audio icon. The widget can include: a control element and a guide container, and the control element can slide within the guide container. The user can input a gesture input or a touch input to slide the control element within the guide container to invoke a control function (e.g., to control the volume). According to interaction 900, the hand of the user is detected to be over a bottom left area of the screen at 920 (e.g., the touch input to the touchscreen is input at an area corresponding to the bottom left area of the screen), and as a result, interface 901 is provided at a bottom left corner of the screen at 930.

Figure 10:
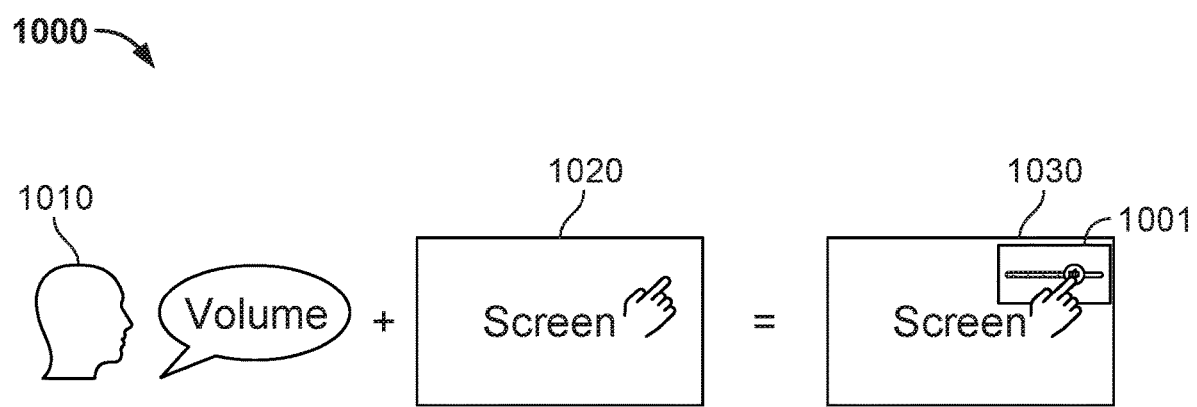
FIG. 10 is a diagram of an interaction between a user and a terminal according to various embodiments of the present application.

FIG. 10 is a diagram of an interaction between a user and a terminal according to various embodiments of the present application.

Referring to FIG. 10, interaction 1000 between a user and a terminal is provided. Interaction 1000 can be implemented in connection with invocation of a function or control of a terminal. Interaction 1000 can be implemented in connection with process 200 of FIG. 2 and/or process 800 of FIG. 8. For example, interaction 1000 can be implemented by process 200 of FIG. 2 and/or process 800 of FIG. 8. Interaction 1000 can be implemented at least in part by system 100 of FIG. 1 and/or computer system 1100 of FIG. 11.

As illustrated in FIG. 10, a flow diagram of an interaction 1000 between a user and a terminal is provided. At 1010, the user inputs a first input (e.g., a voice input). If a voice input (e.g., "volume") is received from a user, the target function is determined. For example, if the voice input corresponds to "volume" or "change the volume," the target function can be determined to be a "volume function," etc. The target function is determined so as to correspond to the voice input. In some embodiments, the target function is determined based on a query of one or more keywords comprised in the voice input performed with respect to a mapping of keywords to functions. In addition, at 1020, a touch input is made to the terminal. For example, the touch input is input via a hand of a user tapping on a screen. The terminal can detect a touch input in response to a touchscreen of the terminal being touched. In response to a determination that a touch input is made to the touchscreen (e.g., the hand of the user taps the touchscreen), the target position is determined according to the hand position (e.g., according to a position at which the touchscreen is tapped). Interface 1001 is configured based at least in part on the voice input and/or the position of the hand (e.g., the location of the touchscreen at which the touch input is input). At 1030, interface 1001 is displayed at the target position on the screen. Interface 1001 can include: a widget and an audio icon. The widget can include: a control element and a guide container, and the control element can slide within the guide container. The user can input a gesture input or a touch input to slide the control element within the guide container to invoke a control function (e.g., to control the volume). According to interaction 1000, the hand of the user is detected to be over a top right area of the screen at 1020 (e.g., the touch input to the touchscreen is input at an area corresponding to the top right area of the screen), and as a result, interface 1001 is provided at a top right corner of the screen at 1030.

A difference between interaction 1000 and interaction 900 of FIG. 9 is the target position of an interface 1001 is different from the target position of the interface 901. Specifically, the target position of the interface 901 is lower-left, and the target position of interface 1001 is upper-right. The target positions can be obtained according to hand position. In some embodiments, the position of the control element may be the position at which the touch input is input to the touchscreen (e.g., the location at which the hand touches the touchscreen).

Various embodiments implement a corresponding function based at least in part on a combination of a voice input and a touch input. By combining the naturalness of speech with the conciseness of touch, various embodiments overcome the problem of the related art according to which interactions are lengthy because the user-terminal interactions are performed using only voice interaction modes (e.g., without the integration of a plurality of interaction modes), and the problem of long operational paths associated with user-terminal interactions are performed using only a touch interaction mode. Accordingly, various embodiments facilitate the invocation of functions by a user with relative ease as compared to the related art.

First, an interface is invoked and/or displayed in response to a single voice input. Accordingly, reducing the number of voice interactions used in connection with invoking a function is reduced.

Moreover, an interface can quickly and directly be obtained via a single input, which decreases the operating paths involved in implementing a function through the touch interaction mode. Accordingly, the relative operational difficulty for the user is decreased.

According to various embodiments, the target position at which the interface is provided on the screen matches a position of the user (e.g., a position of the user with respect to the terminal). For example, the target position at which the interface is provided on the screen matches a position of the hand of the user. Thus, relatedness between the user (e.g., the hand of the user) and the interface is increased, and an effect in which the interface is provided to correspond to a location of the hand of the user is implemented. As a result, hand operations become more convenient, and the user experience is improved.

Figure 11:
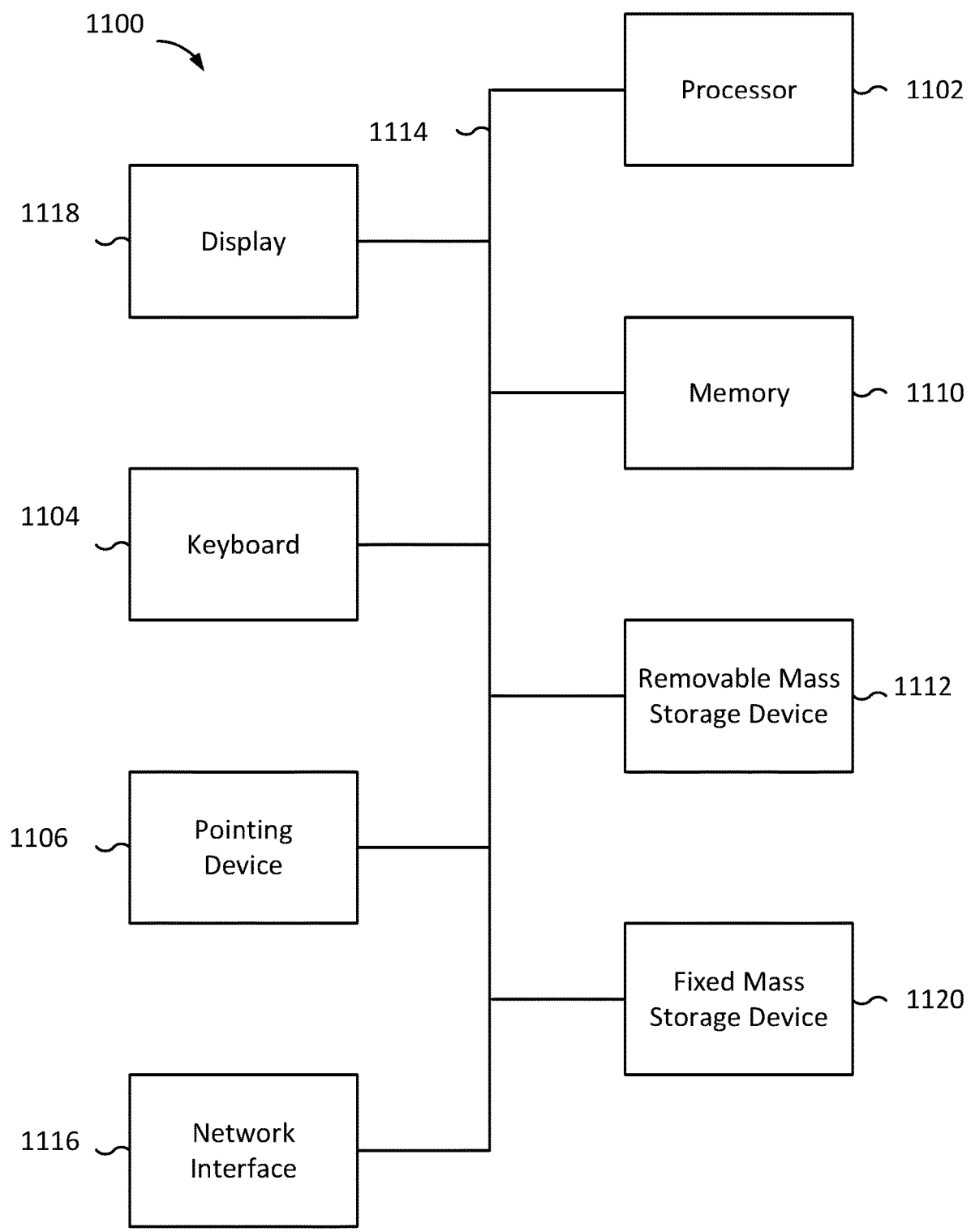
FIG. 11 is a functional diagram of a computer system for data processing according to various embodiments of the present application.

FIG. 11 is a functional diagram of a computer system for data processing according to various embodiments of the present application.

Referring to FIG. 11, computer system 1100 for invoking a function or controlling a terminal is provided. Computer system 1100 can implement at least part of process 200 of FIG. 2, process 300 of FIG. 3, interaction 400 of FIG. 4, interaction 500 of FIG. 5, interaction 600 of FIG. 6, interaction 700 of FIG. 7, process 800 of FIG. 8, interaction 900 of FIG. 9, and/or interaction 1000 of FIG. 10. Computer system 1100 can be implemented at least in part of system 100 of FIG. 1.

Processor 1102 is coupled bi-directionally with memory 1110, which can include a first primary storage, typically a random access memory (RAM), and a second primary storage area, typically a read-only memory (ROM). As is well known in the art, primary storage can be used as a general storage area and as scratch-pad memory, and can also be used to store input data and processed data. Primary storage can also store programming instructions and data, in the form of data objects and text objects, in addition to other data and instructions for processes operating on processor 1102. Also as is well known in the art, primary storage typically includes basic operating instructions, program code, data, and objects used by the processor 1102 to perform its functions (e.g., programmed instructions). For example, memory 1110 can include any suitable computer-readable storage media, described below, depending on whether, for example, data access needs to be bi-directional or uni-directional. For example, processor 1102 can also directly and very rapidly retrieve and store frequently needed data in a cache memory (not shown). The memory can be a non-transitory computer-readable storage medium.

A removable mass storage device 1112 provides additional data storage capacity for the computer system 1100, and is coupled either bi-directionally (read/write) or uni-directionally (read only) to processor 1102. For example, storage 1112 can also include computer-readable media such as magnetic tape, flash memory, PC-CARDS, portable mass storage devices, holographic storage devices, and other storage devices. A fixed mass storage 1120 can also, for example, provide additional data storage capacity. The most common example of mass storage 1120 is a hard disk drive. Mass storage device 1112 and fixed mass storage 1120 generally store additional programming instructions, data, and the like that typically are not in active use by the processor 1102. It will be appreciated that the information retained within mass storage device 1112 and fixed mass storage 1120 can be incorporated, if needed, in standard fashion as part of memory 1110 (e.g., RAM) as virtual memory.

In addition to providing processor 1102 access to storage subsystems, bus 1114 can also be used to provide access to other subsystems and devices. As shown, these can include a display monitor 1118, a network interface 1116, a keyboard 1104, and a pointing device 1106, as well as an auxiliary input/output device interface, a sound card, speakers, and other subsystems as needed. For example, the pointing device 1106 can be a mouse, stylus, track ball, or tablet, and is useful for interacting with a graphical user interface.

The network interface 1116 allows processor 1102 to be coupled to another computer, computer network, or telecommunications network using a network connection as shown. For example, through the network interface 1116, the processor 1102 can receive information (e.g., data objects or program instructions) from another network or output information to another network in the course of performing method/process steps. Information, often represented as a sequence of instructions to be executed on a processor, can be received from and outputted to another network. An interface card or similar device and appropriate software implemented by (e.g., executed/performed on) processor 1102 can be used to connect the computer system 1100 to an external network and transfer data according to standard protocols. For example, various process embodiments disclosed herein can be executed on processor 1102, or can be performed across a network such as the Internet, intranet networks, or local area networks, in conjunction with a remote processor that shares a portion of the processing. Additional mass storage devices (not shown) can also be connected to processor 1102 through network interface 1116.

An auxiliary I/O device interface (not shown) can be used in conjunction with computer system 1100. The auxiliary I/O device interface can include general and customized interfaces that allow the processor 1102 to send and, more typically, receive data from other devices such as microphones, touch-sensitive displays, transducer card readers, tape readers, voice or handwriting recognizers, biometrics readers, cameras, portable mass storage devices, and other computers.

The computer system shown in FIG. 11 is but an example of a computer system suitable for use with the various embodiments disclosed herein. Other computer systems suitable for such use can include additional or fewer subsystems. In addition, bus 1114 is illustrative of any interconnection scheme serving to link the subsystems. Other computer architectures having different configurations of subsystems can also be utilized.

The systems, means, modules, or units illustrated by the above embodiments specifically may be implemented by computer chips or entities or by products having certain functions. A typical implementing device is a computer. The particular form a computer may take may be a personal computer, laptop computer, cellular phone, camera phone, smart phone, personal digital assistant, media player, navigation device, email receiving device, game console, tablet computer, wearable device, or a combination of any of these devices.

In a typical configuration, a computer comprises one or more processors (CPUs), input/output ports, network interfaces, and memory.

Memory may include the following forms in computer-readable media: volatile memory, random access memory (RAM), and/or non-volatile memory, e.g., read-only memory (ROM) or flash RAM. Memory is an example of a computer-readable medium.

Accordingly, various embodiments further provide a computer-readable medium storing computer programs. When executed, the computer programs are capable of implementing all the steps executable by a server in the method embodiments described above.

The memory in FIG. 11 may take the form of any type of volatile or non-volatile storage device or combination thereof. Examples include static random access memory (SRAM), electrically erasable programmable read-only memory (EEPROM), erasable programmable read-only memory (EPROM), programmable read-only memory (PROM), read-only memory (ROM), magnetic memory, flash memory, magnetic disks, and optical disks.

Computer system 1100 of FIG. 11 can include a communication component that is configured to facilitate wired or wireless communication between the device on which the communication component is located and other devices. The device where the communication component is located may access wireless networks based on a communications standard such as Wi-Fi, 2G, 3G, or a combination thereof. In an exemplary embodiment, the communication component receives via broadcast channels broadcast signals or broadcast-related information from external broadcast management systems. In an exemplary embodiment, said communication component further comprises a near-field communication module for promoting short-range communication. For example, it can be achieved in the NFC module on the basis of radio-frequency identification (RFID) technology, Infrared Data Association (IrDA) technology, ultra-wide band (UWB) technology, Bluetooth (BT) technology, and other technology.

Display 1118 in FIG. 11 above includes a screen, and the screen may include a liquid crystal display (LCD) or a touch panel (TP). If the screen comprises a touch panel, the screen may be implemented as a touchscreen to receive input signals from the user. The touch panel comprises one or more touch sensors to detect touch, sliding actions, and gestures on the touch panel. Said touch sensor can not only detect the boundaries of touch or slide actions, but also measure the duration and pressure related to said touch or slide operations.

Computer system 1100 of FIG. 11 can include a power supply component that is configured to provide electric power to all components in the device where the power supply component is located. The power supply component may include a power supply management system, one or more power supplies, and other components related to generating, managing, and allocating power to the device where the power supply component is located.

A person skilled in the art should understand that the embodiments of the present invention can be provided as methods, systems or computer program products. Therefore, the present invention may take the form of complete hardware embodiments, complete software embodiments, or embodiments that combine software and hardware. Moreover, the present invention may take the form of computer program products implemented on one or more computer-operable storage media (including but not limited to magnetic disk storage, CD-ROMs, and optical storage) containing computer-operable program code.

Please note that all the method embodiments have been presented as a series of a combination of actions in order to simplify the description. However, persons skilled in the art should know that embodiments of the present application are not limited by the action sequences that are described, for some of the steps may make use of another sequence or be implemented simultaneously in accordance with embodiments of the present application. Secondly, persons skilled in the art should also know that the embodiments described in the specification are all preferred embodiments. The actions that they involve are not necessarily required by embodiments of the present application. With regard to an embodiment, at least one of the processors 1102 may be packaged together with the logic of one or more controllers (e.g., memory controllers) of a system control module. With regard to an embodiment, at least one of the processors 1102 may be packaged together with the logic of one or more controllers of the system control logic module to form a system-in-package (SiP). With regard to an embodiment, at least one of the processors 1102 may be integrated with the logic of one or more controllers of the system control module in a single new product. With regard to an embodiment, at least one of the processors 1102 may be integrated with the logic of one or more controllers of the system control module to form a system-on-a-chip (SoC) on a single chip.

If the display comprises a touch panel, the display screen can be implemented as a touchscreen display to receive input signals from the user. The touch panel can include one or more touch sensors to detect touch, sliding actions, and gestures on the touch panel. The touch sensor can not only detect the boundaries of touch or slide actions, but also measure the duration and pressure related to said touch or slide operations.

Various embodiments further provide a non-volatile, readable storage medium. The storage medium stores one or more modules (programs), and when these one or more modules are applied on an apparatus, the modules can cause the apparatus to execute the instructions of each method in embodiments of the present application.

With regard to the apparatus in the embodiment described above, the particular ways in which the various modules execute operations have already been described in detail in the method embodiments and will not be explicated in detail here. One may refer to some of the explanations in the method embodiments where appropriate.

Each of the embodiments contained in this specification is described in a progressive manner. The explanation of each embodiment focuses on areas of difference from the other embodiments, and the descriptions thereof may be mutually referenced regarding portions of each embodiment that are identical or similar.

Embodiments of the present application are described with reference to flow charts and/or block diagrams based on methods, devices (systems), and computer program products of the embodiments of the present application. Please note that each process and/or block within the flowcharts and/or block diagrams and combinations of processes and/or blocks within the flowcharts and/or block diagrams can be implemented by computer instructions. These computer program instructions can be provided to a general-purpose computer, a special-purpose computer, embedded processors, or processors of other programmable data-processing apparatuses to give rise to a machine such that the instructions executed by the processors of the computer or other programmable data-processing apparatuses give rise to means used to implement the functions specified in one or more processes in a flowchart and/or in one or more blocks in a block diagram.

These computer program instructions can also be stored in computer-readable memory that can guide computers or other programmable data-processing apparatuses to operate according to specific modes, with the result that the instructions stored in this computer-readable memory give rise to products that include command means. These command means implement the functions specified in one or more processes in a flow chart and/or one or more blocks in a block diagram.

These computer program instructions can also be loaded onto a computer or other programmable data-processing apparatus, with the result that a series of operating steps are executed on a computer or other programmable apparatus so as to give rise to computer processing. In this way, the instructions executed on a computer or other programmable apparatus provide steps for implementing the functions specified by one or more processes in a flow chart and/or one or more blocks in a block diagram.

Although preferred embodiments of the present application have already been described, persons skilled in the art can make other modifications or revisions to these embodiments once they grasp the basic creative concept. Therefore, the attached claims are to be interpreted as including the preferred embodiments as well as all modifications and revisions falling within the scope of the embodiments of the present application.

Lastly, it must also be explained that, in this document, relational terms such as "first" or "second" are used only to differentiate between one entity or operation and another entity or operation, without necessitating or implying that there is any such actual relationship or sequence between these entities or operations. Furthermore, the terms "comprise" or "contain" or any of their variants are to be taken in their non-exclusive sense. Thus, processes, methods, objects, or means that comprise a series of elements not only comprise those elements, but also comprise other elements that have not been explicitly listed or elements that are intrinsic to such processes, methods, objects, or means. In the absence of further limitations, for an element that is limited by the phrase "comprises a(n) . . . ", the existence of additional identical elements in processes, methods, objects, or means that comprise said elements is not excluded.

Detailed introductions were provided above to a data processing method, a data processing means, an apparatus, and a machine-readable medium provided by the present application. This document has applied specific examples to explain the principles and implementations of the present application. The above descriptions of the embodiments are only for the purpose of aiding the understanding of the methods and core concepts of the present application. A person with ordinary skill in the art will always be able to make modifications in keeping with the idea of the present application to specific embodiments and scopes of the application. The content of this specification should not be understood as limiting the present application.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:
    obtaining, by one or more processors, a first input, the first input being input via a first interaction mode;
    providing, by the one or more processors, an interface on a display of a terminal, wherein:
        a type of interface is provided based at least in part on the first input;
        a target location of the display of the terminal at which the interface is provided is determined based at least in part on a location of a user relative to the terminal; and
        the interface is provided based at least in part on the type of the interface and the target location;
    obtaining, by the one or more processors, a second input, the second input being input via a second interaction mode, the second interaction mode being different from the first interaction mode; and
    performing, by the one or more processors, a function corresponding to the interface, the function being based at least in part on one or more of the first input, the first interaction mode, the second input, and the second interaction mode.

2. The method of claim 1, wherein the target position is determined based at least in part on a position of a user in relation to a terminal when the first input is input to the terminal.

3. The method of claim 1, wherein the first interaction mode is a voice interaction mode, and the second interaction mode is a gesture interaction mode or a touch interaction mode; or
    the first interaction mode is the touch interaction mode, and the second interaction mode is the gesture interaction mode or the voice interaction mode; or
    the first interaction mode is the gesture interaction mode, and the second interaction mode is the touch interaction mode or the voice interaction mode.

4. The method of claim 1, wherein the first interaction mode is a voice interaction mode, the first input is a voice command, and the voice command indicates the function to be invoked in connection with the second input.

5. The method of claim 4, wherein the second interaction mode is determined to be a touch interaction mode in response to a determination that a touch input is input to a touchscreen of a terminal.

6. The method of claim 4, wherein the second interaction mode is determined to be a gesture interaction mode in response to a determination that a gesture is input before a touch input is input to a touchscreen of a terminal.

7. The method of claim 1, wherein the interface is provided at a target position, the target position is determined based at least in part on a position of a user in relation to a terminal at a time at which the first input is input to the terminal, and the position of the user in relation to the terminal corresponds to a position of a hand of the user.

8. The method of claim 1, wherein the interface comprises: a widget, the widget including a control element, and the control element is configured to respond to a slide event.

9. The method of claim 8, wherein a position of the control element matches a position of a hand of a user.

10. The method of claim 1, wherein the interface comprises: function information.

11. The method of claim 10, wherein the second interaction mode is a gesture interaction mode, and the performing the function corresponding to the interface comprises:
    in response to a determination that the second input corresponds to a function-selecting gesture, executing a target function corresponding to the function-selecting gesture.

12. The method of claim 11, wherein a position at which the function information is displayed is mapped to an orientation of the function-selecting gesture.

13. The method of claim 1, further comprising:
    stopping the display of the interface in response to a determination that a third input satisfies one or more predefined conditions.

14. A device, comprising:
    one or more processors configured to:
        obtain a first input, the first input being input via a first interaction mode;
        provide an interface on a display of the device, wherein:
            a type of interface is provided based at least in part on the first input;
            a target location of the display of a terminal at which the interface is provided is determined based at least in part on a location of a user relative to the terminal; and
            the interface is provided based at least in part on the type of the interface and the target location;

obtain a second input, the second input being input via a second interaction mode, the second interaction mode being different from the first interaction mode; and perform a function corresponding to the interface, the function being based at least in part on one or more of the first input, the first interaction mode, the second input, and the second interaction mode; and one or more memories coupled to the one or more processors, configured to provide the one or more processors with instructions.

15. The device of claim 14, wherein the target position is determined based at least in part on a position of a user in relation to the device at a time at which the first input is input to the device.

16. The device of claim 14, wherein the first interaction mode is a voice interaction mode, and the second interaction mode is a gesture interaction mode or a touch interaction mode; or the first interaction mode is the touch interaction mode, and the second interaction mode is the gesture interaction mode or the voice interaction mode; or the first interaction mode is the gesture interaction mode, and the second interaction mode is the touch interaction mode or the voice interaction mode.

17. The device of claim 14, wherein the first interaction mode indicates the function to be invoked in connection with the second input.

18. The device of claim 17, further comprising a touchscreen, wherein:

the second interaction mode is determined to be a touch interaction mode in response to a determination that a touch input is input to the touchscreen; or the second interaction mode is determined to be a gesture interaction mode in response to a determination that a gesture is input before a touch input is input to the touchscreen.

19. The device of claim 14, wherein the interface comprises: a widget, the widget including a control element, and the control element is configured to respond to a slide event, and a position of the control element matches a position of a hand of a user.

20. A computer program product, the computer program product being embodied in a non-transitory computer readable storage medium and comprising computer instructions for:

obtaining, by one or more processors, a first input, the first input being input via a first interaction mode;

providing, by the one or more processors, an interface on a display of a terminal, wherein:
- a type of interface is displayed based at least in part on the first input;
- a target location of the display of the terminal at which the interface is provided is determined based at least in part on a location of a user relative to the terminal; and
- the interface is provided based at least in part on the type of the interface and the target location;

obtaining, by the one or more processors, a second input, the second input being input via a second interaction mode, the second interaction mode being different from the first interaction mode; and performing, by the one or more processors, a function corresponding to the interface, the function being based at least in part on one or more of the first input, the first interaction mode, the second input, and the second interaction mode.

\* \* \* \* \*